US008666147B2

(12) United States Patent
Kokojima et al.

(10) Patent No.: US 8,666,147 B2
(45) Date of Patent: Mar. 4, 2014

(54) MULTI-VIEW IMAGE GENERATING METHOD AND APPARATUS

(75) Inventors: Yoshiyuki Kokojima, Kanagawa (JP); Akira Morishita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 13/412,741

(22) Filed: Mar. 6, 2012

(65) Prior Publication Data

US 2012/0170833 A1 Jul. 5, 2012

Related U.S. Application Data

(63) Continuation of application No. PCT/JP2009/066618, filed on Sep. 25, 2009.

(51) Int. Cl.
*G06K 9/00* (2006.01)

(52) U.S. Cl.
USPC .......................................................... 382/154

(58) Field of Classification Search
USPC ........................... 382/154, 284; 345/419–420
See application file for complete search history.

(56) References Cited

U.S. PATENT DOCUMENTS

| 2009/0079728 | A1 | 3/2009 | Sugita et al. | |
| 2009/0079761 | A1 | 3/2009 | Kokojima | |
| 2010/0208994 | A1* | 8/2010 | Yao et al. | 382/173 |

FOREIGN PATENT DOCUMENTS

| EP | 0896301 A1 * | 10/1999 | ............. G06T 15/10 |
| JP | 3358466 | 10/2002 | |
| JP | 2005-229560 | 8/2005 | |
| JP | 2009-75869 | 4/2009 | |
| JP | 2009-80578 | 4/2009 | |

OTHER PUBLICATIONS

Computer translation of Japanese Patent No. 2005-229560, pp. 1-12.*
International Search Report from Japanese Patent Office for International Application No. PCT/JP2009/066618, mailed Dec. 15, 2009.

* cited by examiner

*Primary Examiner* — Daniel Mariam
(74) *Attorney, Agent, or Firm* — Finnegan, Henderson, Farabow, Garrett & Dunner, L.L.P.

(57) ABSTRACT

According to an embodiment, a multi-view image generating method includes synthesizing images having a same depth value into a single image from among a plurality of images, based on depth values each being associated with one of the plurality of images and indicating image position in the depth direction of the image; shifting, with respect to each of a plurality of viewpoints each giving a different disparity, a synthesized image obtained at the synthesizing, according to a shift vector corresponding to the viewpoint and the depth value of the synthesized image in a direction and with an amount indicated in the shift vector, so as to generate an image having disparity given thereto; and generating a multi-view image in which the images that are shifted and that are given disparity at the shifting are arranged in a predetermined format.

6 Claims, 18 Drawing Sheets

TILE-SHAPED MULTI-VIEW IMAGE

TILE-SHAPED MULTI-VIEW IMAGE

MULTI-VIEW IMAGE GENERATING METHOD AND APPARATUS

CROSS-REFERENCE TO RELATED APPLICATIONS

This application is a continuation of PCT international application Ser. No. PCT/JP2009/066618 filed on Sep. 25, 2009 which designates the United States; the entire contents of which are incorporated herein by reference.

FIELD

Embodiments described herein relate generally to a method of generating multi-view images.

BACKGROUND

Typically, when the integral imaging technique or the like is implemented to display a stereoscopic image with the use of a multi-view image, a single intermediate image is formed by arranging in a tile-like manner a plurality of single-view images that constitute the multi-view image. Then, the intermediate image is subjected to processing such as encoding. At the time of displaying, the pixel arrays of the intermediate image are rearranged so as to convert the intermediate image into a multi-view synthetic image in which interleaving is performed with respect to the pixels corresponding to the positions of the single-view images Japanese Patent No. 3358466. This technique is also suitable while drawing a CG (computer graphics) stereoscopic image Japanese Patent Application Laid-open No. 2009-075869.

In order to draw CG, a multi-view image having objects drawn therein in advance is pasted on a quadrangular polygon and drawing is performed in real time from a plurality of viewpoints Japanese Patent Application Laid-open No. 2009-080578.

However, a plurality of single-view images having a plurality of viewpoints need to be drawn in each tile of a multi-view image. As the number of objects to be displayed as stereoscopic images increases, the single-view images of those objects increase in number thereby resulting in an increase in the drawing count in the tile-shaped multi-view image. That causes a drop in the imaging speed of the multi-view image.

DETAILED DESCRIPTION

According to an embodiment, a multi-view image generating method includes synthesizing images having a same depth value into a single image from among a plurality of images, based on depth values each being associated with one of the plurality of images and indicating image position in the depth direction of the image; shifting, with respect to each of a plurality of viewpoints each giving a different disparity, a synthesized image obtained at the synthesizing, according to a shift vector corresponding to the viewpoint and the depth value of the synthesized image in a direction and with an amount indicated in the shift vector, so as to generate an image having disparity given thereto; and generating a multi-view image in which the images that are shifted and that are given disparity at the shifting are arranged in a predetermined format.

Exemplary embodiments are described below in detail with reference to the accompanying drawings. First of all, the explanation is given about a stereoscopic image displaying apparatus that is capable of displaying multi-view images generated by implementing a multi-view-image generating method according to the present embodiment.

Figure 1:
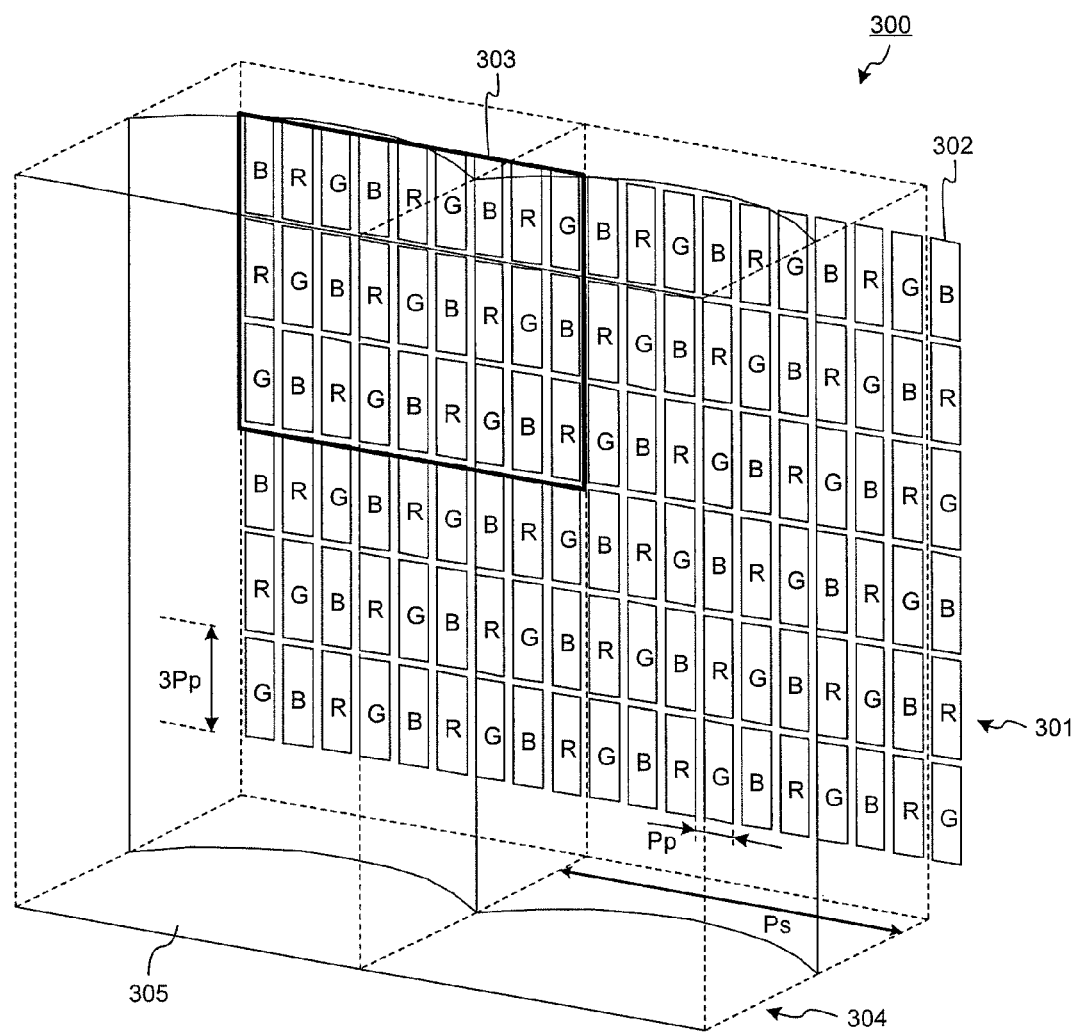
FIG. 1 illustrates a configuration of a display unit applicable to an embodiment.

FIG. 1 is a perspective view that schematically illustrates an exemplary configuration of a display unit 300 in the stereoscopic image displaying apparatus, which is capable of displaying multi-view images generated by implementing the multi-view-image generating method according to the present embodiment. Herein, the explanation is given under the assumption that a viewpoint count n=9. As illustrated in FIG. 1, the display unit 300 includes a display device 301 and includes a lenticular plate 304 that is installed as a light beam controlling element on the front side of a display surface of the display device 301. As the display device 301, it is possible to make use of, for example, an LCD (Liquid Crystal Display).

On the display surface of the display device 301, sub-pixels 302 having the aspect ratio 3:1 are arranged horizontally and linearly in a single row. Each sub-pixel 302 is arranged in such a matrix-lime manner that red (R), green (G), and blue (B) are alternately arranged in the horizontal direction in the same row. On the other hand, the sub-pixels 302 are also arranged vertically and linearly in a single column. Each sub-pixel 302 is arranged in such a way that R, G, and B are alternately arranged in the same column. Meanwhile, a longitudinal cycle (3Pp) of the sub-pixel rows is thrice a horizontal cycle Pp of the sub-pixels 302.

In a commonly-used color image displaying apparatus, a single effective pixel has three of the sub-pixels 302 having RGB arranged horizontally. The sub-pixels 302 have the aspect ratio of 3:1 for the reason that they serve as the smallest units in which brightness and colors can be set in an arbitrary manner. In the display screen illustrated in FIG. 1, three of the sub-pixels 302 having RGB arranged longitudinally constitute a single effective pixel, and nine effective pixels lying adjacent in the horizontal direction constitute a single unit pixel group 303 (in FIG. 1, illustrated in a frame).

Herein, the unit pixel group 303 is a pixel group in which is displayed an image that is made of pixels located at the same position in a plurality of single-view images constituting a multi-view image. That is, in the unit pixel group 303, a set of pixel data causing disparity is displayed.

A cylindrical lens 305 constituting the lenticular plate 304 is disposed substantially in front of the unit pixel group 303. In the example illustrated in FIG. 1, the horizontal pitch (Ps) of the cylindrical lens 305 is nine times the horizontal cycle Pp of the sub-pixels 302 arranged on the display surface. With such a configuration, the sub-pixels 302 which appear magnified over the cylindrical lens undergo a change depending on the variation in the viewing position in the horizontal direction. Since there is a change in the appearance of a multi-view synthetic image displayed in each unit pixel group 303, it becomes possible for the viewer to view a stereoscopic image. Meanwhile, herein, a multi-view synthetic image points to a single image formed by means of interleaving with respect to the pixels corresponding to the positions of a plurality of single-view images.

Figure 2:
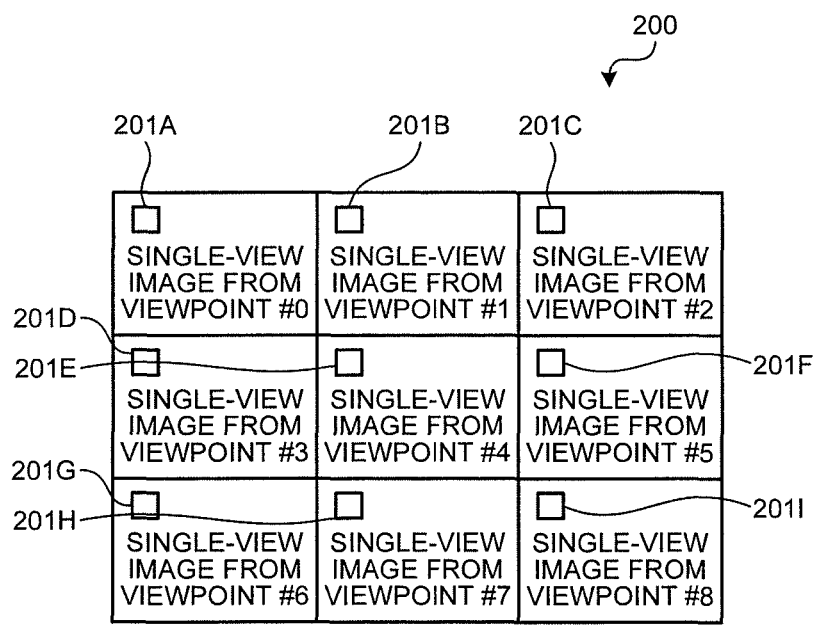
FIG. 2 illustrates explanation of a multi-view image.

Given below with reference to FIG. 2 is the explanation regarding a multi-view image displayed on the display unit 300 having the configuration illustrated in FIG. 1. FIG. 2 illustrates an example of a multi-view image 200 having the viewpoint count n=9. Herein, the multi-view image 200 is an intermediate image in which single-view images having different viewpoints from a viewpoint #0 to a viewpoint #8 are arranged in a predetermined format (for example, in a tile-like arrangement). However, in an intermediate image, the arrangement of single-view images is not limited to the tile-like arrangement as illustrated in FIG. 2. Alternatively, for example, the single-view images can also be arranged in a row. Besides, as long as a plurality of single-view images constituting a multi-view image can be processed collectively, some other arrangement can also be implemented.

The operations of encoding, storing, transmission, and decoding of the multi-view image are performed with respect to the intermediate image. An intermediate image in which single-view images corresponding to all viewpoints constitute a single multi-view image can be subjected to a compression coding method (such as the MPEG (Moving Pictures Experts Group) method or the JPEG (Joint Photographic Experts Group) method) that makes use of spatial correlation of the images. Herein, pixels 201A to 201I that are located at the same position in each tile are displayed in the nine effective pixels (FIG. 1) in the single unit pixel group 303.

Figure 3A:
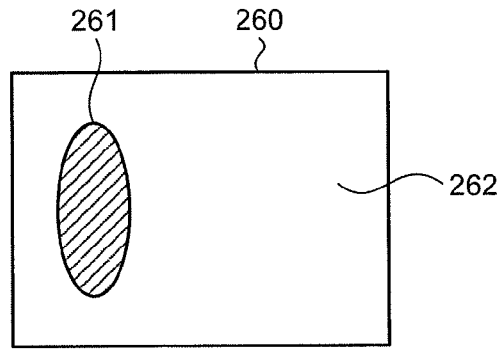
FIG. 3A illustrates an example of an object in a single-view image.
Figure 3B:
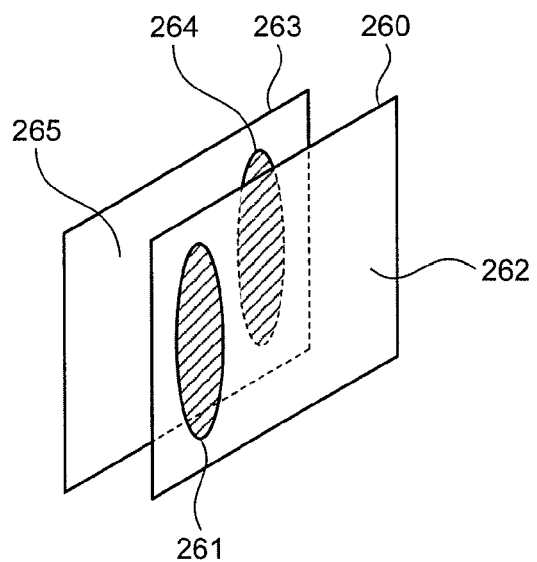
FIG. 3B illustrates an example of an object in a single-view image.
Figure 3C:
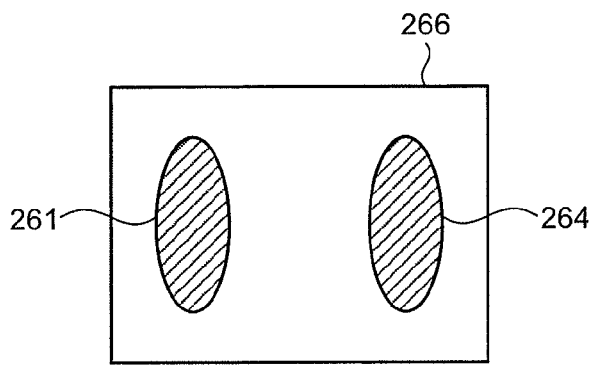
FIG. 3C illustrates an example of an object in a single-view image.

Given below schematically with reference to FIG. 3A to FIG. 3C is the explanation regarding objects on single-view images. A single-view image 260 illustrated in FIG. 3A holds image information in the form of a brightness Y and color difference UV components on a pixel-by-pixel basis or in the form of color components of the three primary colors RGB, as well as holds attribute information A. Herein, the attribute information A contains α values indicating opacity on a pixel-by-pixel basis. When an α value is in the range of 0≤α≤1, the value 0 indicates that the corresponding pixel is transparent and the value 1 indicates that the corresponding pixel is completely opaque. In the example illustrated in FIG. 3A, the α values of the pixels constituting an object 261 are set not to 0 but to a value other than 0 such as 1. In the single-view image 260, a region 262 other than the object 261 is a transparent region with the α value thereof set to 0.

Such α values are put to use while performing image synthesis. For example, it is assumed that the image information is expressed in terms of the brightness Y and the color difference UV components; it is assumed that, in a first image representing the foreground, a pixel n has a brightness $Y_1$; and it is assumed that a predetermined α value is set in the pixel n. Moreover, it is assumed that, in a second image representing the background, a pixel m located at the position corresponding to the pixel n has a brightness $Y_2$. Assuming that 0≤α≤1 is true, when the first image and the second image are synthesized, the pixel obtained by synthesizing the pixel n and the pixel m has the brightness Y obtained by, for example, Expression (1) given below. Such a way of synthesizing images using the α values is called alpha blending.

$$Y=(1-\alpha)\times Y_2+\alpha\times Y_1 \quad (1)$$

FIG. 3B illustrates an example of synthesizing, in a superposed manner, a plurality of single-view images 260 and 263, each having a region of pixels with the α values set to 0. In the single-view image 260 on the near side, the pixels constituting the object 261 are set to have α=1 and the region 262 other than the object 261 is set to have α=0. Regarding the single-view image 263 too, in an identical manner, the pixels constituting an object 264 are set to have α=1 and a region 265 other than the object 264 is set to have α=0.

FIG. 3C illustrates an example of the result of synthesizing the single-view images 260 and 263 illustrated in FIG. 3B. In a single-view image 266 obtained by synthesis is placed the object 261 of the pre-synthesis single-view image 260. Along with that, the object 264 of the pre-synthesis single-view image 263, which is synthesized with the single-view image 260 from behind, transmits through the transparent region 262 of the near-side single-view image 260 (pre-synthesis) and is placed in the single-view image 266.

Explained below in detail are first to third methods of drawing a multi-view image in a tile-like manner by means of CG. In the first method, an object (a character) expressed with a polygon mesh or the like is drawn in real time from a plurality of viewpoints. By changing the shape of the polygon in real time, it becomes possible to have an interactive display. Such a method is suitable for applications such as home-use games that demand high interactivity. On the other hand, taking into account the throughput, it is not an easy task to draw a multi-view image of high image quality in real time, that is, within a limited time frame.

Figure 4:
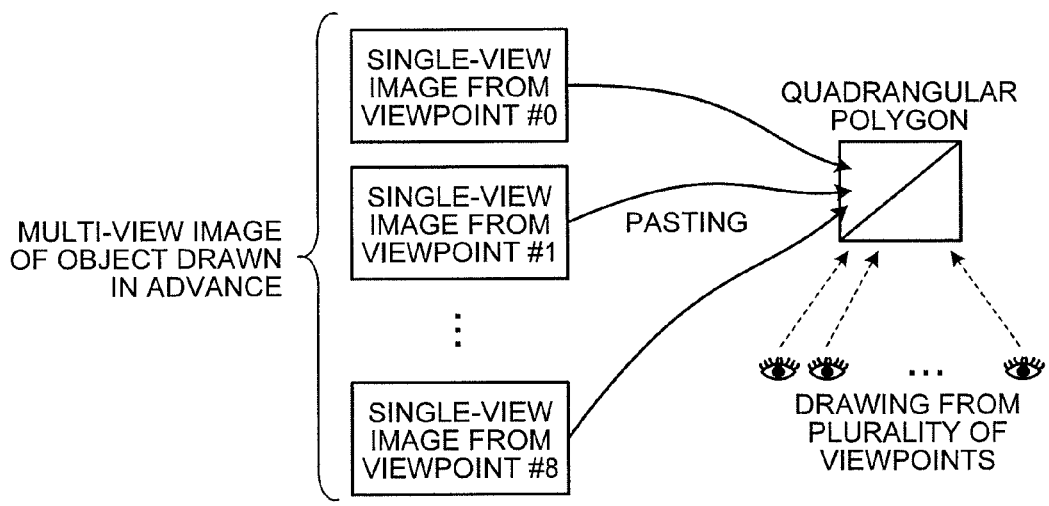
FIG. 4 illustrates multiple view sprite.

In the second method, as illustrated in FIG. 4, a multi-view image that is created in advance is pasted on a quadrangular polygon and drawing is performed in real time from a plurality of viewpoints. Regarding the drawing from each viewpoint, the image corresponding to that viewpoint is selected from the multi-view image and is pasted as texture on the quadrangular polygon. Thus, depending on the viewpoint, a different texture is pasted on the quadrangular polygon. This second method is called multiple view sprite.

The multiple view sprite is not suitable in expressing interactivity such as changing the actions of characters in response to user operations. On the other hand, the multiple view sprite enables high-speed drawing of multi-view images that are produced and thus is suitable for applications such as movies. In this multiple view sprite, since each pixel in the image of each viewpoint can be given a different disparity, it becomes possible to reproduce the stereoscopic effect (mounds or depressions) in the objects drawn in a multi-view image. Meanwhile, since it is necessary to store, in a memory, all of the multi-view images that are drawn in advance; a high-capacity memory needs to be installed.

Figure 5:
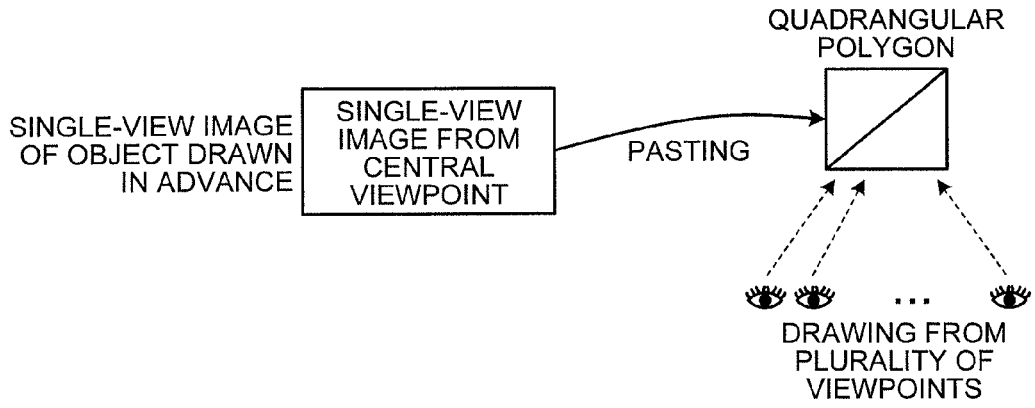
FIG. 5 illustrates single view sprite.

In the third method, as illustrated in FIG. 5, one single-view image that has been created in advance is pasted on a quadrangular polygon and drawing is performed in real time from a plurality of viewpoints. Regarding the drawing from each viewpoint, a single-view image drawn from a particular viewpoint (typically, the central viewpoint) is pasted as texture on the quadrangular polygon. Thus, in each viewpoint, the same texture is pasted on the quadrangular polygon. This third method is called single view sprite.

In the single view sprite, all pixels in each viewpoint have the same disparity. Thus, it is not possible to reproduce the stereoscopic result of an object displayed in a multi-view image. However, in the single view sprite, it is possible to express the planar depth of the entire object. That is, it is possible to express the depth while placing the object as an image surface in the three-dimensional space. Besides, the single view sprite can be implemented with a smaller amount of memory consumption as compared to the multiple view sprite.

As far as the contents of game machines installed in amusement centers are concerned, interactivity is expressed by drawing in advance a number of objects as separate images and by presenting those objects to the viewers with superimposition of the objects at arbitrary timings.

As a method of displaying such contents in a stereoscopic image displaying apparatus using the integral imaging technique (hereinafter, abbreviated as II technique) or the like; the use of multiple view sprite can be an option. However, as already described above, the multiple view sprite causes a lot of memory consumption. If all objects of a number of objects are drawn using the multiple view sprite, the memory consumption is so large that it is not a practical option. On the other hand, in many contents, it is not necessary to display all of the objects in a stereoscopic manner. Hence, for example, in a situation of bringing excitement to the contents, only the objects which are intended to pop out toward the viewers can be drawn using the multiple view sprite, while the other objects can be drawn using the single view sprite. As a result, it becomes possible to balance the amount of memory consumption and the high interactivity.

Given below is the explanation of an embodiment of the present invention. In order to perform drawing using the single view sprite that is considered as the third method, an LSI capable of performing three-dimensional CG drawing is used. That is, in order to speed up the operation of pasting single-view images on the quadrangular polygon and to perform drawing by sequentially shifting the single-view images in the horizontal direction, the operation is performed using a hardware component such as an LSI capable of performing three-dimensional CG drawing. In recent years, for example, the majority of house-use game machines are equipped with LSIs capable of performing three-dimensional CG drawing. Hence, an LSI capable of performing three-dimensional CG drawing can be used for the drawing that is performed equivalently using the single view sprite explained with reference to FIG. 5.

Figure 6:
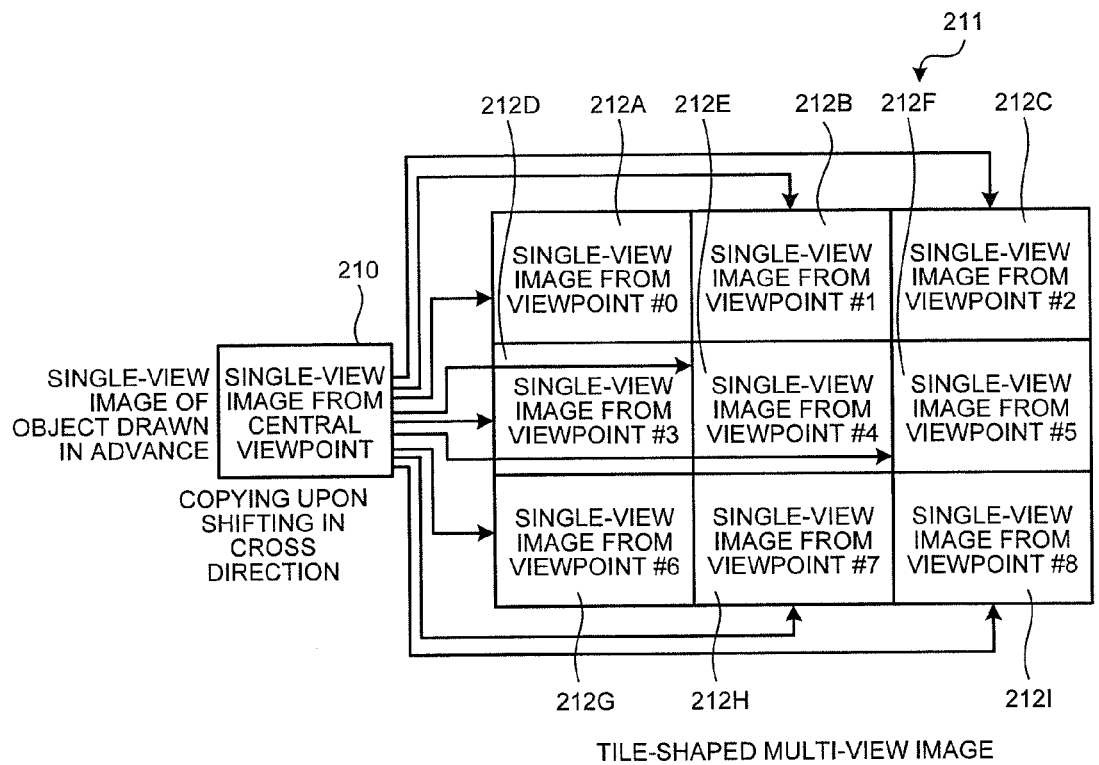
FIG. 6 illustrates another example of single view sprite.

In contrast, as far as the game machines installed in amusement centers are concerned, LSIs capable of performing two-dimensional CG drawing are installed because they are low in cost and consume less amount of electricity. In the present embodiment, LSIs capable of performing two-dimensional CG drawing can also be used for the drawing with the single view sprite. As illustrated in FIG. 6, one single-view image 210 that has been drawn in advance is shifted in the cross direction, and is copied in each of tiles 212A to 212I in a tile-shaped multi-view image 211 that correspond to the viewpoints #0 to #8.

Herein, the shift direction and the shift amount is changed according to the viewpoint (target tile for copying) and according to the amount of depth (position in the depth direction) for placing the object in the single-view image 210. As a result, with respect to the single-view image copied in the tiles, it becomes possible to apply the same disparity as applied in the case illustrated in FIG. 5 when an LSI capable of performing three-dimensional CG drawing is used for drawing from different viewpoints. The single view sprite according to the present embodiment is hereinafter referred to as two-dimensional single view sprite.

Figure 7:
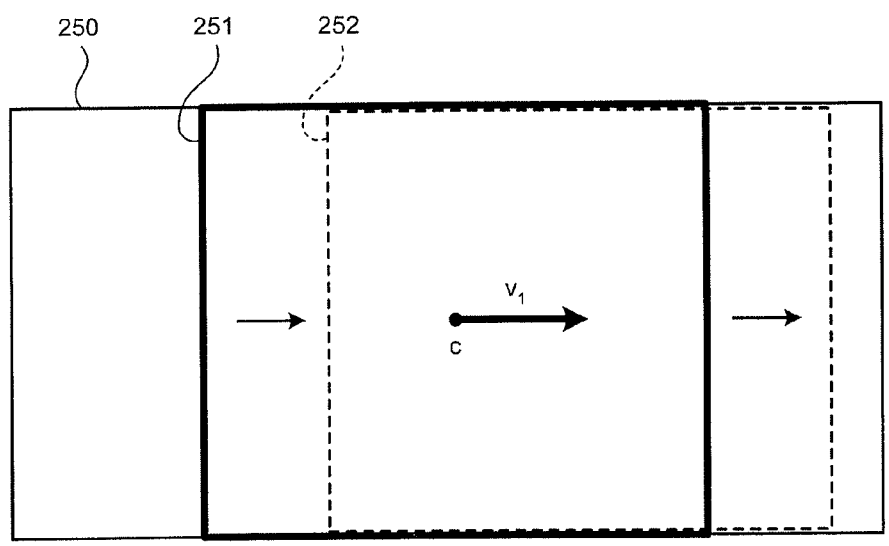
FIG. 7 illustrates a method of generating an image shifted by shifting an object in the cross direction.

Regarding an exemplary method, as illustrated in FIG. 6, for generating an image by shifting the object in the single-view image 210 in the cross direction, the explanation is given with reference to FIG. 7. A single-view image 250, which has a larger size than the size of each of the tiles 212A to 212I, is created from the central viewpoint. Then, an image having the size equal to the size of tiles is clipped from the single-view image 250, and the clipped image is copied in the tiles. While clipping the image, depending on each of the viewpoints #0 to #8, the position of clipping is shifted in the cross direction so that images drawn from different viewpoints are obtained from the same image. Herein, shifting an image means moving the valid display range in the image.

When the display unit 300 is compatible to the disparity in the horizontal direction; as illustrated in FIG. 7, an image 251 having the same size as that of the tiles is clipped from the central part of the single-view image 250, which is larger in size in the horizontal direction than the tiles. Thus, the single-view image 210 corresponding to the central viewpoint is obtained. Moreover, in the horizontal direction (in this example, in the rightward direction) from the center of the single-view image 250, an image 252 is clipped that has the same size as that of the tiles and that has the center at a position obtained by a shift equivalent to a vector $v_1$ according to the viewpoint and the depth amount. Thus, a single-view image having the viewpoint shifted in the horizontal direction is obtained. Such a single-view image is copied in the tile of the corresponding viewpoint from among the tiles 212A to 212I.

In an identical manner, from the central part of a single-view image having a larger size in the vertical direction than the tiles, an image is clipped that has the center at a position obtained by a vertical shift equivalent to a vector according to the viewpoint and the depth amount. Thus, a single-view image having the viewpoint shifted in the vertical direction can be obtained. With that, it becomes possible to deal with the disparity in the vertical direction. Besides, if the method of generating a single-view image having the viewpoint shifted in the vertical direction is combined with the method of generating a single-view image having the viewpoint shifted in the horizontal direction, it becomes possible to deal with the disparity in any direction.

Herein, regarding the case of implementing the two-dimensional single view sprite according to the present embodiment for drawing a plurality of objects, the explanation is given with reference to FIG. 8 to FIG. 12. For example, each of a plurality of single-view images that have an image (object) from the central viewpoint drawn therein in advance is shifted according to the depth amount and the viewpoint and copied in each tile in a tile-shaped multi-view image.

Regarding single-view images 230A to 230E illustrated in FIG. 8 to FIG. 12, mutually different objects are drawn and the regions other than the objects are set to be transparent with α=0. Moreover, each of the single-view images 230A to 230E has a depth amount set therein.

Figure 8:
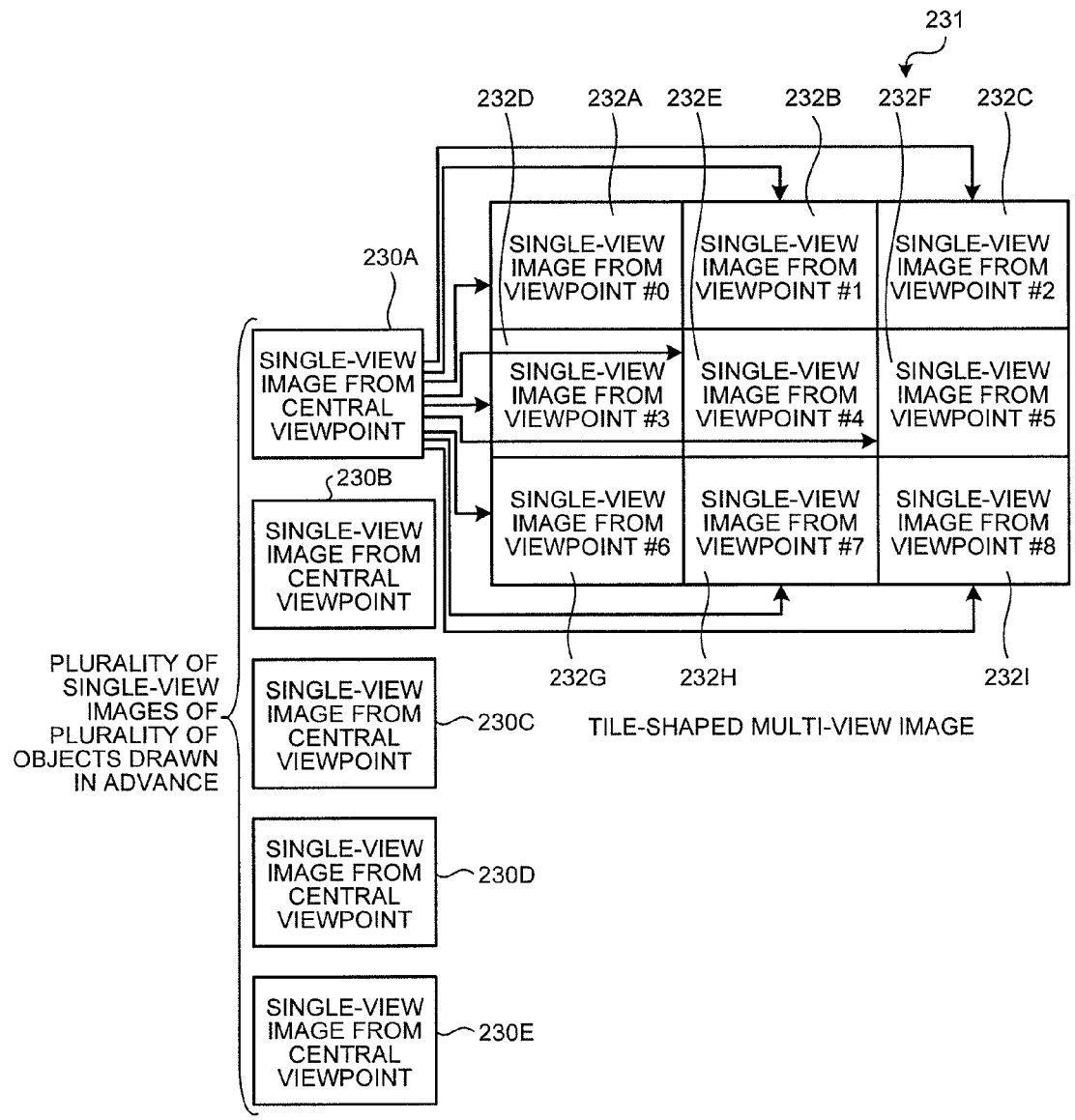
FIG. 8 illustrates drawing of a plurality of objects by implementing single view sprite.
Figure 9:
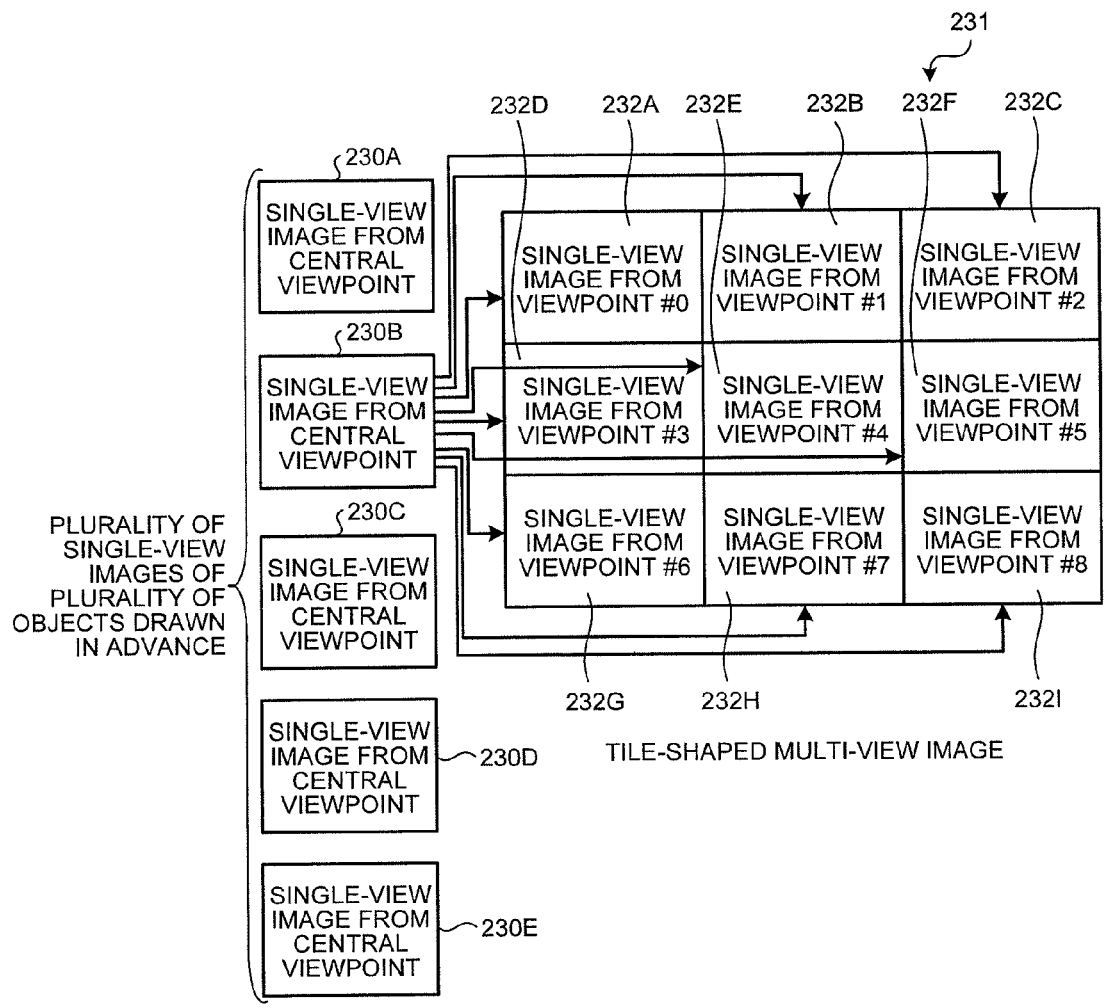
FIG. 9 illustrates drawing of a plurality of objects by implementing single view sprite.
Figure 10:
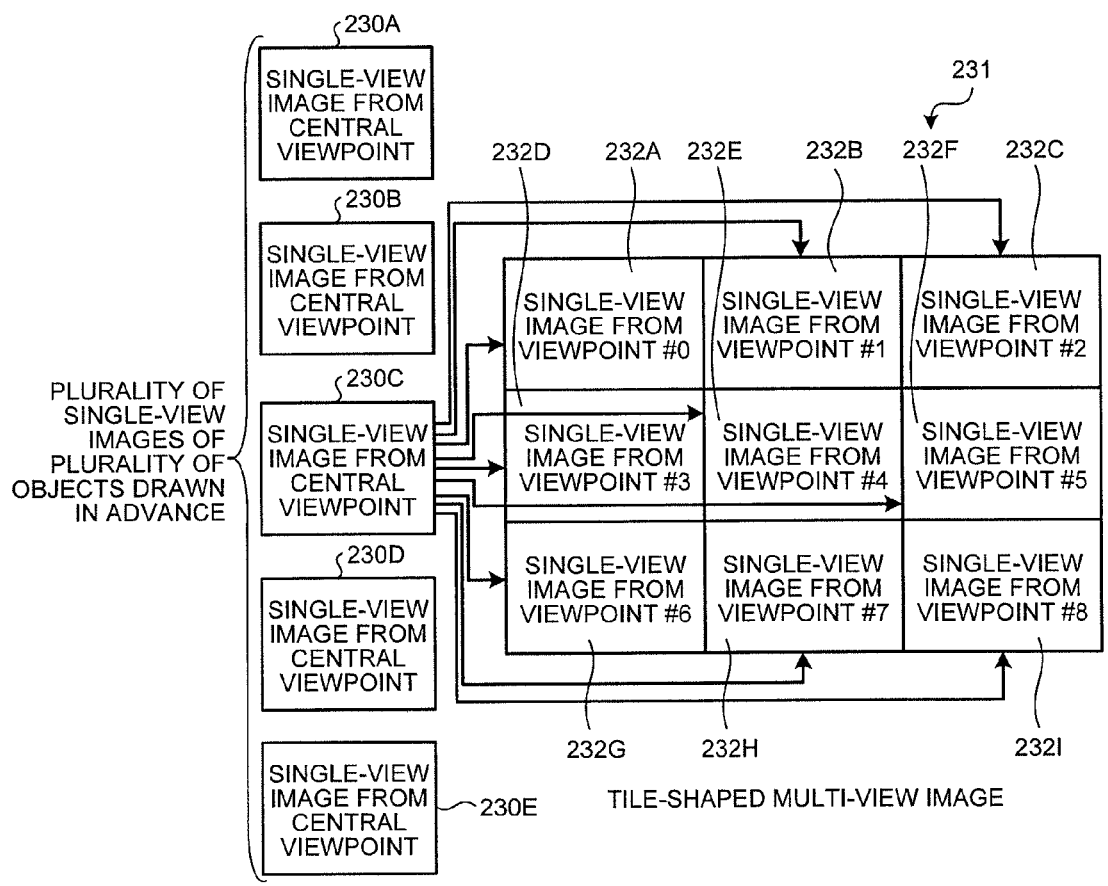
FIG. 10 illustrates drawing of a plurality of objects by implementing single view sprite.
Figure 11:
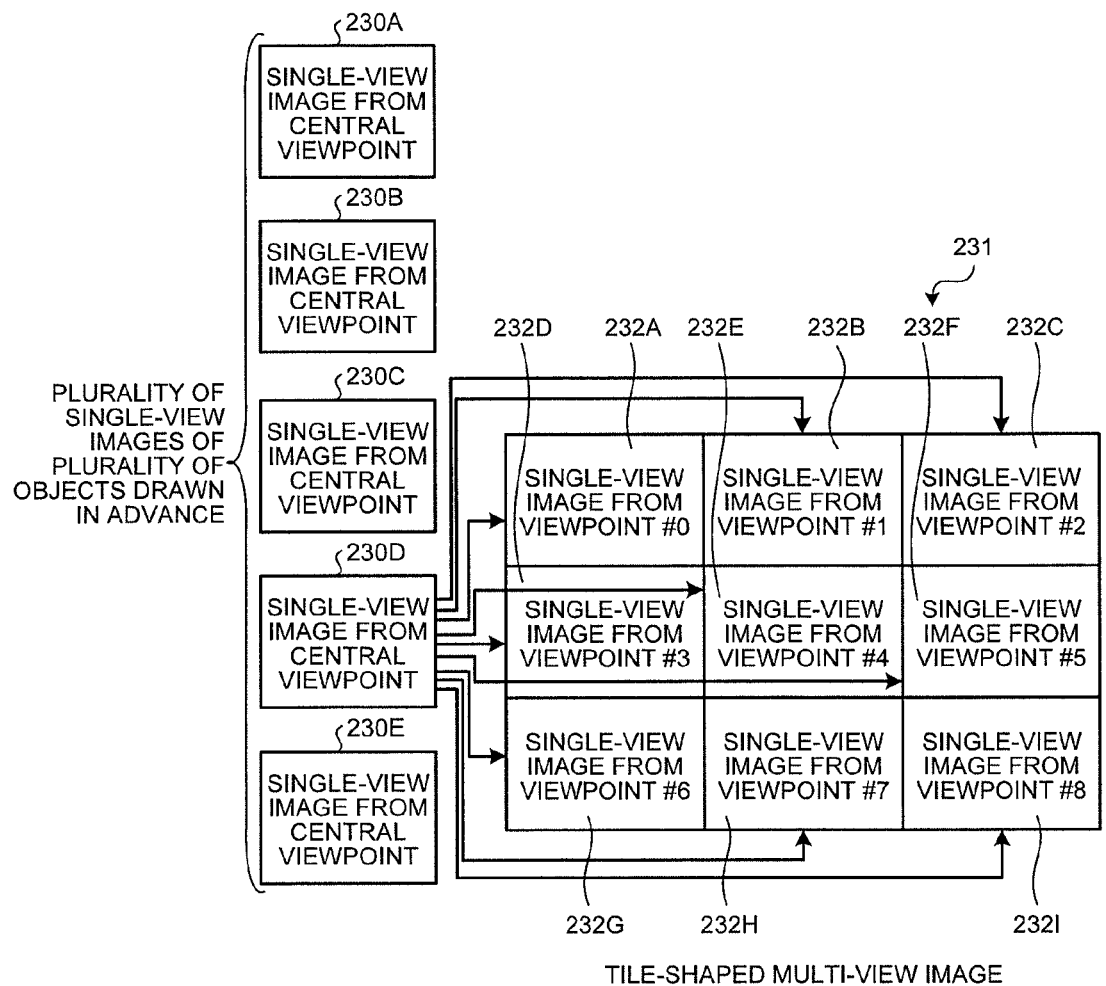
FIG. 11 illustrates drawing of a plurality of objects by implementing single view sprite.
Figure 12:
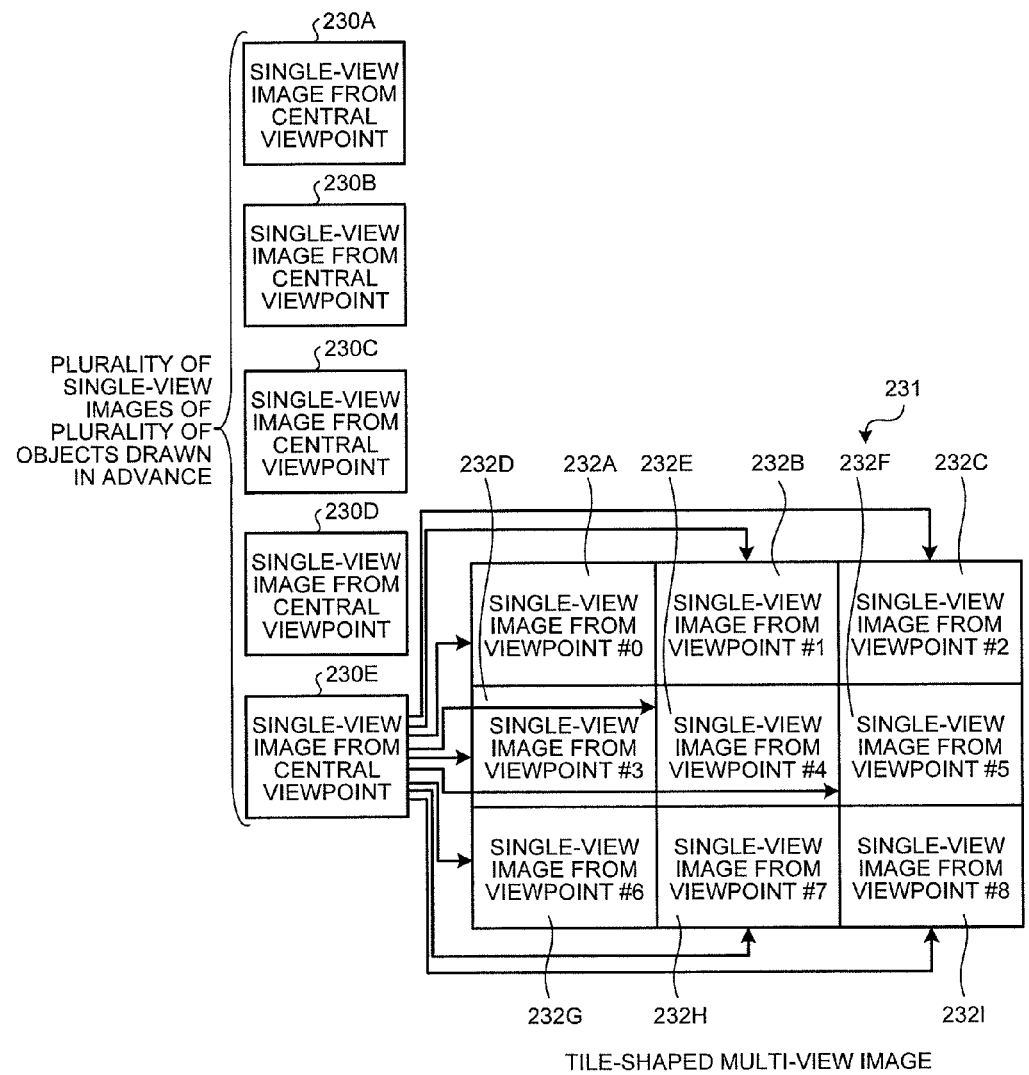
FIG. 12 illustrates drawing of a plurality of objects by implementing single view sprite.

Firstly, as illustrated in FIG. 8, the single-view image 230A is shifted according to the depth amounts and the viewpoints #0 to #8, and the shifted images are respectively copied in tiles 232A to 232I of a tile-shaped multi-view image 231. Then, the single-view image 230B is shifted according to the depth amounts and the viewpoints #0 to #8, and the shifted images are respectively copied in the tiles 232A to 232I of the tile-shaped multi-view image 231. At that time, α-value-based alpha blending is performed so as to synthesize the images copied in the tiles 232A to 232I with the images that have already been copied in the tiles 232A to 232I. Regarding each of the single-view images 230C to 230E too, shifting is performed in an identical manner according to the depth amounts and the shifted single-view image is copied and synthesized in each tile of the tile-shaped multi-view image as illustrated in FIG. 10 to FIG. 12, respectively.

If the single-view images 230A to 230E are dynamic images having mutual synchronization therebetween; then, from each of the above-mentioned single-view images 230A to 230E, the operation of copying in each tile of a tile-shaped multi-view image needs to be completed at least within a single frame period of the dynamic images.

In this way, in the two-dimensional single view sprite according to the present embodiment; the position at which an image is clipped from an original image for the purpose of copying the clipped image in the tiles is shifted according to the viewpoints and the depth amounts. Such a method can also be implemented without difficulty using LSIs capable of performing two-dimensional CG drawing. On the flip side, even when the two-dimensional single view sprite is implemented, an increase in the number of objects to be displayed leads to an increase in the copying count for copying the single-view images. Hence, as the number of objects increases, the imaging speed of the multi-view image decreases. Hence, for example, the displaying may get delayed or the system may suffer from an increase in the load.

In that regard, in the present embodiment, the attention is focused on the fact that objects placed at the same depth are shifted in the same direction and by the same amount in each viewpoint. Thus, the single-view images of the objects placed at the same depth are synthesized in a single image and then the synthesized single image is shifted according to the depth amounts and the viewpoints, and is copied in each tile of a tile-shaped multi-view image. As a result, the copying count for copying the single-view images can be reduced substantially thereby making it possible to enhance the imaging speed.

Figure 13:
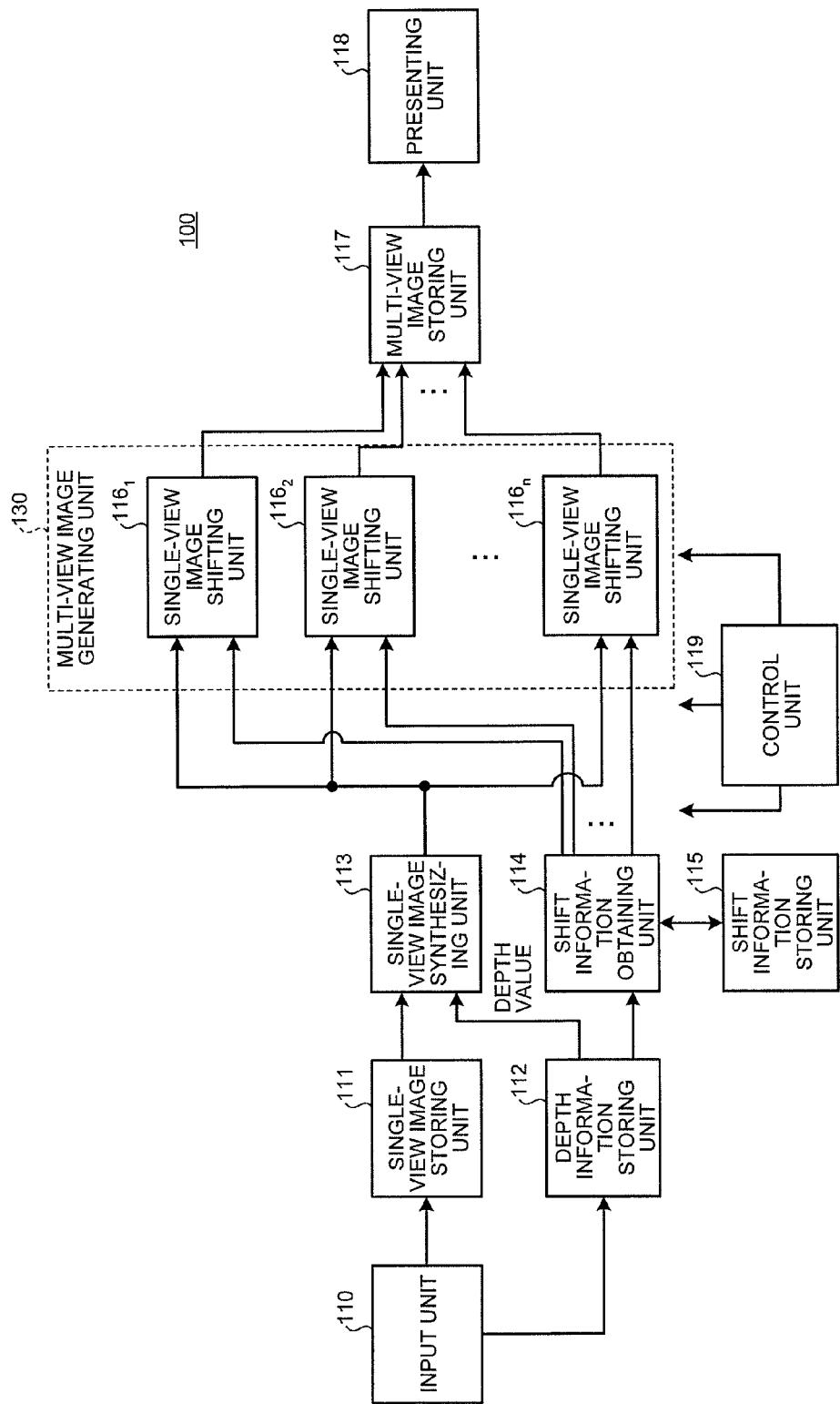
FIG. 13 is a block diagram illustrating the functions of an image processing apparatus according to the embodiment.

Given below is an image processing method according to the present embodiment implemented to perform such operations. FIG. 13 is an exemplary functional block diagram illustrating the functions of a multi-view image generating apparatus 100 that implements a multi-view image generating method according to the present embodiment. As illustrated in FIG. 13, the multi-view image generating apparatus 100 includes an input unit 110, a single-view image storing unit 111, a depth information storing unit 112, a single-view image synthesizing unit 113, a shift information obtaining unit 114, a shift information storing unit 115, a plurality of single-view image shifting units 116, a multi-view image storing unit 117, a presenting unit 118, and a control unit 119.

Herein, the control unit 119 controls all constituent elements of the multi-view image generating apparatus 100.

The input unit 110 receives input of a plurality of single-view images, each having an object drawn therein in advance, and receives input of depth values indicating the depth amounts of those objects. To the input unit 110, the single-view images and the depth values can be input from a hard disk or from a volatile or nonvolatile memory, or can be input from an image generating apparatus such as a camera. Alternatively, the single-view images and the depth values can be input via a decoder of an image reproducing apparatus or the like. Still alternatively, if the mutual correspondence relationship between the single-view images and the depth values is clear, then the single-view images and the depth values can be input as separate data. Of course, the depth values can be specified in the attribute information A of the respective single-view images, and then only the single-view images can be input.

Figure 14:
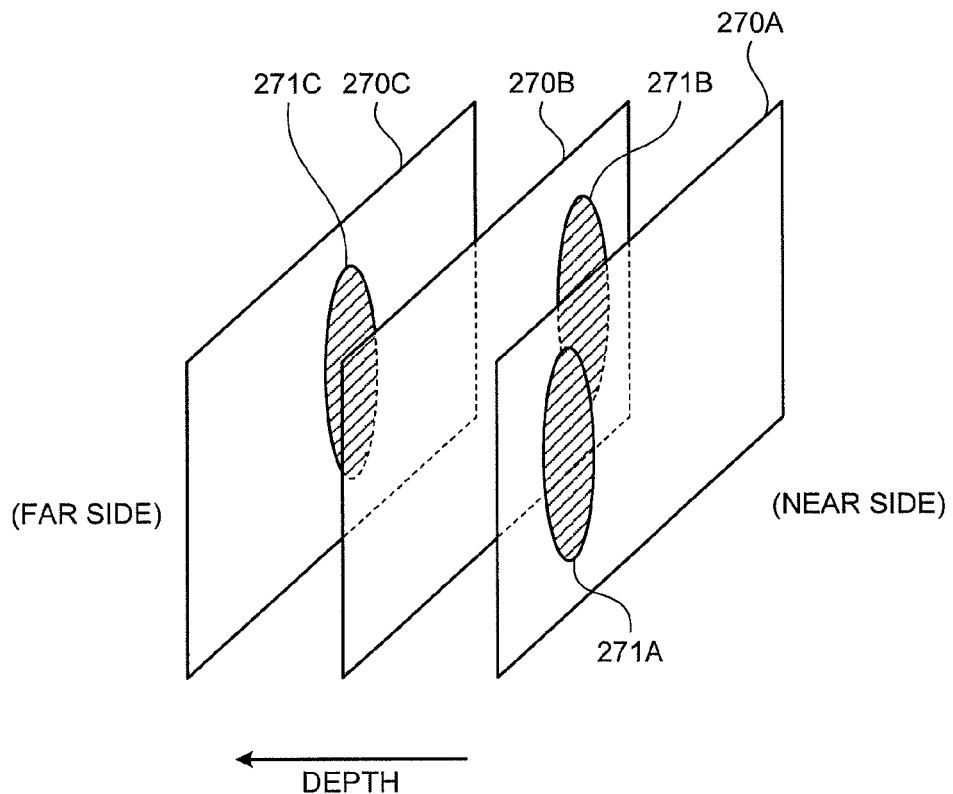
FIG. 14 illustrates a relationship between the placement positions of objects and the depth values.

Given below with reference to FIG. 14 is a schematic explanation of the relationship between the placement positions of objects and the depth values. As illustrated in FIG. 14, objects 271A, 271B, and 271C are respectively drawn in single-view images 270A, 270B, and 270C. In the example illustrated in FIG. 14, the object 271A is placed on the nearest side, while the object 271C is placed on the farthest side. Thus, the object 271B is placed in between the objects 271A and 271C. In such a case, the object 271A placed on the nearest side has the smallest depth amount and is set with the smallest depth value. In comparison, with the movement toward the far side, the depth amounts increase and larger depth values are set.

The plurality of single-view images received by the input unit 110 are stored in the single-view image storing unit 111. Herein, the single-view images are sorted in such a way that the depth values of the drawn objects are arranged in the order of placement starting from the far side toward the near side, and the sorted single-view images are then stored in the single-view image storing unit 111. Alternatively, the single-view images can also be sorted in such a way that the depth values of the drawn objects are arranged in the order of placement starting from the near side toward the far side, and the sorted single-view images can then be stored in the single-view image storing unit 111.

For example, it is determined in advance that the single-view images are input to the input unit 110 in the order of depth values. However, alternatively, the input unit 110 can be configured to perform address control of the single-view image storing unit 111 so that the single-view images that are received as input are stored in the addresses corresponding to the depth values.

Meanwhile, the plurality of depth values that are input to the input unit 110 are stored in the depth information storing unit 112. For that, the depth values of the drawn objects are sorted and arranged in the order of placement starting from the far side toward the near side, and the sorted depth values are stored in the depth information storing unit 112. Alternatively, the depth values of the drawn objects can be sorted and arranged in the order of placement starting from the near side toward the far side, and the sorted depth values are stored in the depth information storing unit 112.

Thus, the depth values are subjected to sorting by magnitude and the sorted depth values are stored in the depth information storing unit 112. At that time, the depth values are sorted in such a manner that the order of arrangement of the depth values corresponds to the order of placement of the objects in the single-view image storing unit 111. In other words, because of the order of arrangement of the depth values in the depth information storing unit 112, the depth values get associated with the plurality of single-view images stored in the single-view image storing unit 111.

From the single-view image storing unit 111, the single-view image synthesizing unit 113 sequentially reads the single-view images from the start. Moreover, from the depth information storing unit 112, the single-view image synthesizing unit 113 sequentially reads the depth values from the start. Then, the single-view image synthesizing unit 113 synthesizes each set of single-view images having the same depth value and outputs the result as a synthesized single-view image. To perform such image synthesis, α-value-based alpha blending is carried out. When only one single-view image corresponds to a particular depth value, then that single-view image is output without modification. A synthesized single-view image or an unmodified single-view image that is output from the single-view image synthesizing unit 113 is then sent to the n number of single-view image shifting units $116_1$, $116_2$, ..., $116_n$.

In the following explanation, unless otherwise specified, synthesized single-view images as well as single-view images are referred to only as single-view images.

Along with outputting the single-view images, the single-view image synthesizing unit 113 sends, to the shift information obtaining unit 114, the depth values corresponding to the single-view images that have been output. Based on the depth values sent thereto, the shift information obtaining unit 114 refers to the shift information storing unit 115 and obtains shift vectors of viewpoints #0 to #n corresponding to the shift values. Those viewpoints #0 to #n are then respectively sent to the single-view image shifting units $116_1$, $116_2$, ..., $116_n$ having the corresponding viewpoints. As described later, the single-view image shifting units $116_1$, $116_2$, ..., $116_n$ constitute a multi-view image generating unit 130 that generates a tile-shaped multi-view image.

Figure 15:
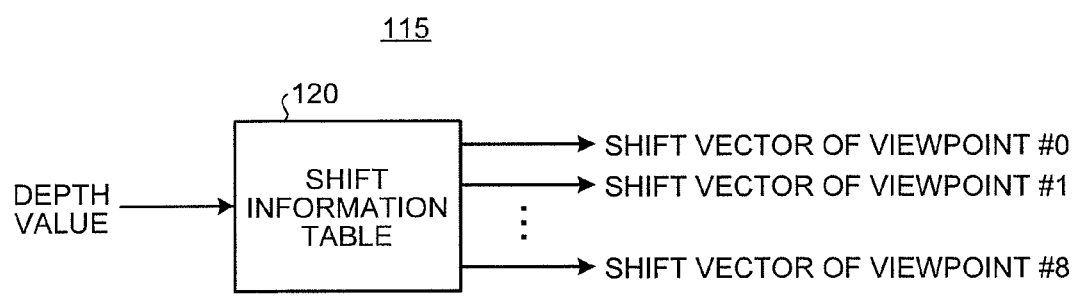
FIG. 15 illustrates explanation of shift information table.

FIG. 15 illustrates an exemplary configuration of the shift information storing unit 115. In the shift information storing unit 115 is stored a shift information table 120. In the shift information table 120, the shift vectors, which represent the shift amount as well as the shift direction of the single-view images, are stored in advance for each of the viewpoints #0 to #8 and for each depth value. More particularly, for example, regarding a single-view image according to the central viewpoint, a shift vector is a two-dimensional vector that indicates the direction of shifting that single-view image at the time of copying it in the tile of each viewpoint constituting a multi-view image. Besides, the size of that shift vector indicates the shift amount. The shift vectors differ according to the viewpoints as well as according to the depth values indicating the depth amounts for placing objects. The shift information table is configured in such a way that the shift vectors of the viewpoints "0 to #n can be referred to with the depth values serving as an index.

Based on the shift vectors received from the shift information obtaining unit 114, the n number of single-view image shifting units $116_1$, $116_2$, ..., $116_n$ shift the single-view images received from the single-view image synthesizing unit 113. The shifting is performed by implementing, for example, the method explained with reference to FIG. 7. The single-view images shifted by the single-view image shifting units $116_1$, $116_2$, ..., $116_n$ are sent to the multi-view image storing unit 117, and are copied in the tiles of the corresponding viewpoints in a tile-shaped multi-view image. If a target tile for copying already has a single-view image copied therein, it is also possible to perform image synthesis by means of alpha blending. Consequently, a multi-view image is generated that is based on the single-view images input to the input unit 110.

A multi-view image stored in the multi-view image storing unit 117 is sent to the presenting unit 118. Then, the presenting unit 118 outputs the multi-view image, which is received from the multi-view image storing unit 117, to a stereoscopic image displaying apparatus. In that case, for example the presenting unit 118 interleaves, for each unit pixel group 303, the single-view image in each tile constituting the multi-view image, and then outputs the post-interleaving multi-view image. However, alternatively, the presenting unit 118 can record the multi-view image, which is received from the multi-view image storing unit 117, in a recording medium; or can transfer that multi-view image to another device via a network or a serial interface. Still alternatively, the multi-view image subjected to interleaving for each unit pixel group 303 can also be printed using a printer.

In the present embodiment, as described above, in the single-view image synthesizing unit 113, the single-view images of the objects placed at the same depth are synthesized in a single image, and then that single image is shifted according to the depth amounts and is copied in each tile of a tile-shaped multi-view image.

As an example, firstly, the single-view image synthesizing unit 113 reads, from the single-view image storing unit 111, the first single-view image from among the single-view images stored in a sorted manner according to the depth values. Along with that, the single-view image synthesizing unit 113 reads, from the depth information storing unit 112, the first depth value from among the depth values stored in a sorted manner.

Then, the single-view image synthesizing unit 113 reads the second depth value from the depth information storing unit 112, and compares the second depth value with the first depth value that has already been read. If the comparison result indicates that the first depth value and the second depth value are identical, then the single-view image synthesizing unit 113 reads the second single-view image from the single-view image storing unit 111 and synthesizes the second single-view image with the single-view image that has already been read so as to generate a new single-view image.

Subsequently, the single-view image synthesizing unit 113 reads, from the depth information storing unit 112, the third depth value from among the depth values stored in a sorted manner; and compares the third depth value with the second depth value that has already been read. If the comparison result indicates that the second depth value and the third depth value are identical, then the single-view image synthesizing unit 113 reads the third single-view image from the single-view image storing unit 111 and synthesizes the third single-view image with the previously-synthesized single-view image so as to generate a new single-view image.

The single-view image synthesizing unit 113 repeats the above-mentioned operation until a depth value read from the depth information storing unit 112 is different than the previously-read depth value. As a result, the single-view images of the objects placed at the same depth can be synthesized in one single-view image. The post-synthesis single-view image is then sent to the single-view image shifting unit having the corresponding viewpoint from among the single-view image shifting units $116_1$, $116_2$, ..., $116_n$; and is shifted according to the viewpoint and the depth value.

Figure 16:
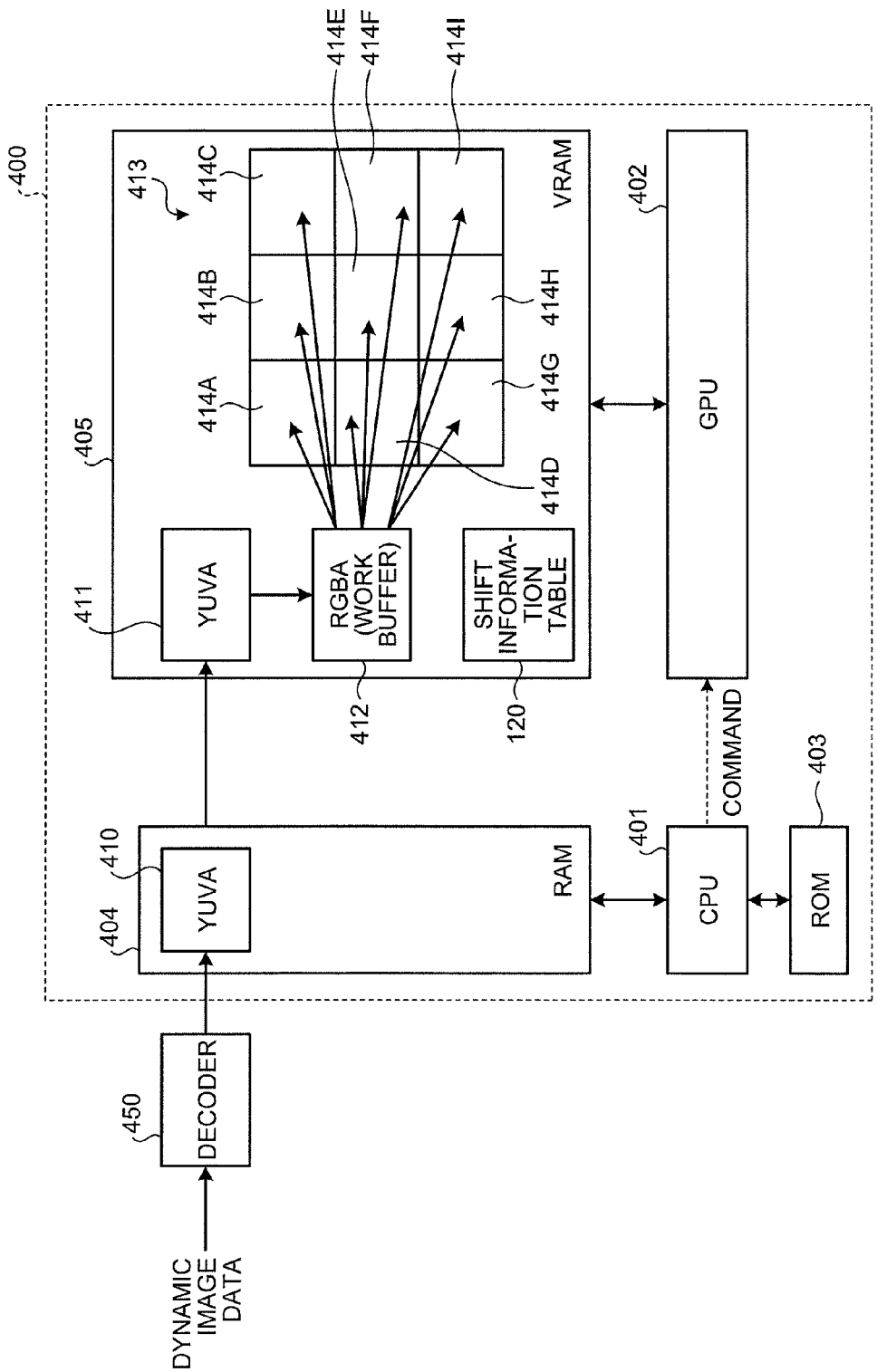
FIG. 16 illustrates a hardware configuration of the image processing apparatus according to the embodiment.

FIG. 16 illustrates an exemplary hardware configuration of an image processing apparatus 400 that can be used as the multi-view image generating apparatus 100 according to the present embodiment. As illustrated in FIG. 16, the image processing apparatus 400 includes a CPU (Central Processing Unit) 401, a GPU (Graphic Processing Unit) 402, a ROM (Read Only Memory) 403, a RAM (Random Access Memory) 404, and a VRAM (Video RAM) 405.

The CPU 401 corresponds to the control unit 119 illustrated in FIG. 13 and controls the operations of the image processing apparatus 400. While performing control, the CPU 401 uses the RAM 404 as the work memory. The programs required for the operations of the CPU 401 are stored in advance in the ROM 403. However, instead of storing the programs in advance in the ROM 403, other methods such as the use of a disk memory medium or a detachable and non-volatile semiconductor memory, or the transmission via a network can be implemented to send the programs to the image processing apparatus 400.

The CPU 401 follows instructions in the programs and sends commands to the GPU 402. Herein, the GPU 402 operates according to the commands issued by the CPU 401 and has the function of performing high-speed image processing. For example, the GPU 402 follows the commands issued by the CPU 401 and processes image data that has been written in the VRAM 405. In the example illustrated in FIG. 16, it is assumed that the GPU 402 is designed to be particularly capable of processing particularly two-dimensional image data.

As an example, when a program for implementing the multi-view image generating according to the present embodiment is, for example, executed upon being read from the ROM 403, the CPU 401 follows instructions in that program and sends a command to the GPU 402 so as to make the GPU 402 function as the above-mentioned constituent elements (as the single-view image synthesizing unit 113 and the shift information obtaining unit 114, and as the single-view image shifting units $116_1$ to $116_n$).

For example, dynamic image data that is subjected to compression coding with the H.264/AVC method is decoded by a decoder 450 and is input to the image processing apparatus 400 as YUVA image data, which contains the brightness Y, the color difference UV components, and the attribute information A. Herein, it is assumed that the attribute information A contains the α values and the depth values. However, alternatively, the depth values can be input to the image processing apparatus 400 as separate data in a synchronous manner to the output from the decoder 450. The YUVA image data that is input to the image processing apparatus 400 is temporarily stored in an area 410 in the RAM 404. Then, the CPU 401 performs control so as to forward the YUVA image data to the VRAM 405.

Upon being forwarded to the VRAM 405, the YUVA image data is written in an area 411 in the VRAM 405. The area 411 corresponds to the single-view image storing unit 111 and the depth information storing unit 112 illustrated in the functional block diagram in FIG. 13. According to a command from the CPU 401, the GPU 402 converts the YUVA image data into RGBA image data that contains the color components of the primary colors RGB and contains the attribute information A. Then, the GPU 402 writes the RGBA image data in a work buffer 412 that is an area in the VRAM 405. Although described later in detail, at that time, the GPU 402 follows a command issued by the CPU 401 and synthesizes the single-view images having the same depth values in an identical manner as described above.

Meanwhile, in the VRAM 405 is written the shift information table 120. Herein, the shift information table 120 is stored in advance in, for example, the ROM 403. At the time when the image processing apparatus 400 is booted, the shift information table 120 is read from the ROM 403 and is written in the VRAM 405 via the RAM 404.

According to a command issued by the CPU 401, the GPU 402 obtains the shift vectors in the viewpoints for which the copying is to be performed. The GPU 402 refers to the shift information table 120 with the depth values corresponding to the single-view images written in the work buffer 412 as an index. Then, according to a command issued by the CPU 401, the GPU 402 shifts the single-view images, which are written in the work buffer 412, according to the shift vectors corresponding to the viewpoints and the depth values. Subsequently, from among tiles 414A to 414I of a tile-shaped multi-view image in an area 413 in the VRAM 405, the GPU 402 performs copying with respect to the tiles having the corresponding viewpoints.

As described above, the GPU 402 that performs operations according to the commands issued by the CPU 401 corresponds to the single-view image synthesizing unit 113, the shift information obtaining unit 114, and the single-view image shifting units $116_1$ to $116_n$ illustrated in FIG. 13. Besides, the area 413 in the VRAM 405 corresponds to the multi-view image storing unit 117 illustrated in FIG. 13.

Figure 17A:
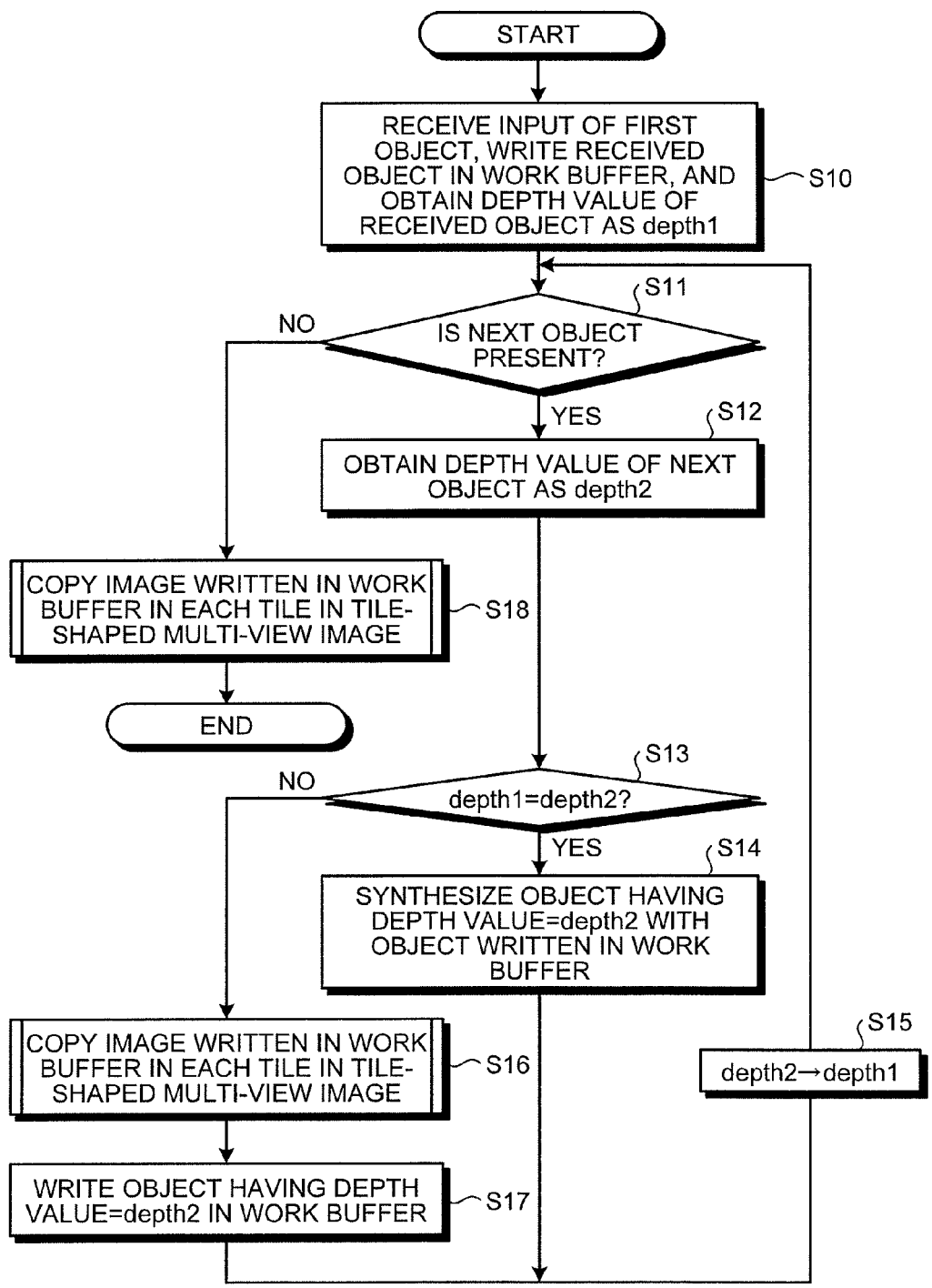
FIG. 17A is a flowchart for explaining synthesis of single-view images according to the embodiment.
Figure 17B:
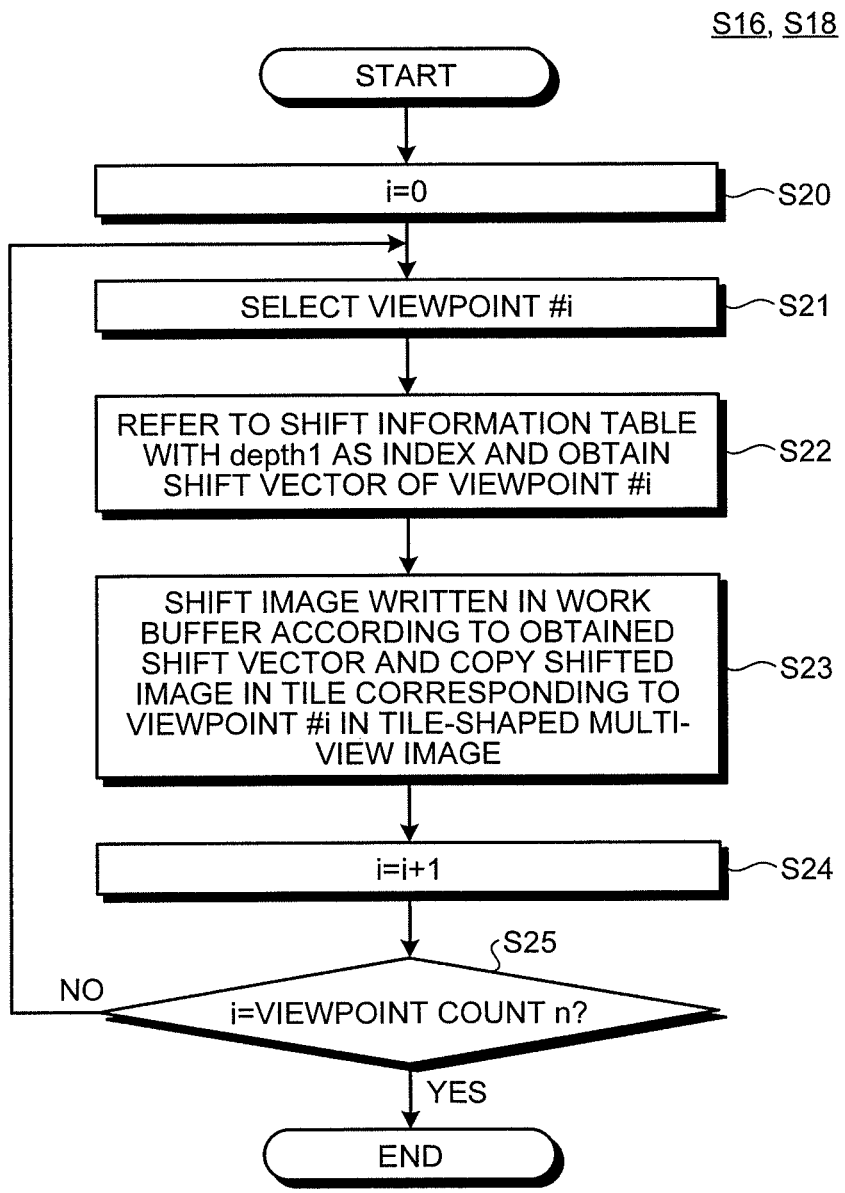
FIG. 17B is a flowchart for explaining synthesis of single-view images according to the embodiment.

FIG. 17A and FIG. 17B are flowcharts for explaining an example of synthesis of single-view images according to the present embodiment. In the following explanation, all operations are performed by, for example, the GPU 402 according to the commands that are issued by the CPU 401 based on the programs.

The objects in single-view images, which are output from the decoder 450, are input to the image processing apparatus 400 and are temporarily stored in the area 410 in the RAM 404. Herein, it is assumed that the decoder 450 is capable of outputting, for example, a plurality of single-view images per frame period of a motion picture and that the plurality of single-view images are arranged from the far side toward the near side according to the depth values.

Firstly, at Step S10, the GPU 402 receives input of the single-view image of the first object from the area 410 in the RAM 404. The GPU 402 converts the single-view image of the first object into RGBA image data via the area 411 in the VRAM 405 and then writes the RGBA image data in the work buffer 412. Along with that, the GPU 402 obtains the depth value corresponding to the first single-view image as a depth value depth1. For example, the GPU 402 obtains the depth value from the attribute information A specified in the RGBA image data for the single-view image.

Then, at Step S11, the GPU 402 determines whether or not there exists a single-view image of the next object. For example, the CPU 401 monitors the status of the area 410 in the RAM 404; determines whether or not there exists a single-view image of the next object in the area 410; and notifies the determination result to the GPU 402. If there exists a single-view image of the next object, then the system control proceeds to Step S12 and the GPU 402 obtains the depth value of the single-view image of the next object. For example, the CPU 401 extracts the attribute information A of the single-view image of the next object stored in the area 410 and sends that attribute information A to the GPU 402. The depth value obtained at Step S12 is referred to as a depth value depth2.

Subsequently, at Step S13, it is determined whether or not the depth value depth1 is same as the depth value depth2. If those depth values are identical, then the system control proceeds to Step S14. Then, at Step S14, the GPU 402 performs alpha blending or the like and synthesizes the single-view image of the object having the depth value depth2 with the single-view image written in the work buffer 412. The α values are extracted from the attribute information A of the respective single-view images. Then, at Step S15, the depth value depth2 is substituted as the depth value depth1 and the system control returns to Step S11.

Meanwhile, at Step S13 described above, if the depth value depth1 is not same as the depth value depth2, the system control proceeds to Step S16. Then, at Step S16, the single-view image written in the work buffer 412 is shifted according to the viewpoints and the depth values and is copied in the tiles 414A to 414I in the tile-shaped multi-view image. The details of the operations at Step S16 are given later.

Once, at Step S16, copying of the work buffer 412 in the tiles 414A to 414I in the tile-shaped multi-view image is complete, the system control proceeds to Step S17. Then, at Step S17, the GPU 402 reads the single-view image of the object having the depth value depth2 from the area 410 of the RAM 404 and inputs it in the VRAM 405. Subsequently, the GPU 402 converts the single-view image of the object having the depth value depth2 into RGBA image data via the area 411 and writes the RGBA image data in the work buffer 412. The system control then proceeds to Step S15 at which the depth value depth2 is substituted as the depth value depth1, and the system control returns to Step S11.

At Step S11 described above, if the next object is absent, then the system control proceeds to Step S18. The operation performed at Step S18 is identical to the operation performed at Step S16 described above. That is, at Step S18, the single-view image written in the work buffer 412 is shifted according to the viewpoints and the depth values and is copied in the tiles 414A to 414I in the tile-shaped multi-view image. The details of the operations at Step S18 are given later.

FIG. 17B is a flowchart for explaining an exemplary operation of copying a single-view image in the tiles of a tile-shaped multi-view image as performed at Step S16 and Step S18 described above. Herein, according to Step S10 and Step S15 described above, the operation is performed on the single-view image corresponding to the depth value depth1. Besides, herein, it is assumed that the viewpoint count is n. In the following explanation, all operations are performed by, for example, the GPU 402 according to the commands that are issued by the CPU 401 based on the programs.

Firstly, at Step S20, a loop variable "i" is initialized to 0. Then, at Step S21, the GPU 402 selects a viewpoint #i; and at Step S22, the GPU 402 refers to the shift information table 120 with the depth value depth1 as an index and obtains the shift vector of the viewpoint #i.

Subsequently, at Step S23, according to the shift vector obtained at Step S22, the GPU 402 shifts the corresponding single-view image that has been written in the work buffer 412 and copies the shifted single-view image in the tile corresponding to the viewpoint #i in the tile-shaped multi-view image. At that time, if that tile already has an image written therein, then the GPU 402 performs alpha blending or the like and synthesizes the single-view image with the image that is already written in the tile.

At Step S23, the single-view image is copied in the tile. At Step S24, the loop variable i is incremented by 1. At Step S25, the GPU 402 determines whether or not the loop variable i is equal to the viewpoint count n. If the loop variable i is determined to be equal to the viewpoint count n; then the GPU determines that the operations have been completed for all of the viewpoints, thus exits the operations in the flowchart illustrated in FIG. 17B, and returns to the operations in the flowchart illustrated in FIG. 17A. On the other hand, if it is determined that the loop variable i and the viewpoint count n are different and that the operations for all of the viewpoints are not yet completed, then the system control returns to Step S21 so that the operations are performed for the next viewpoint.

Regarding the operations performed with reference to the flowcharts in FIG. 17A and FIG. 17B; the explanation in concrete terms is given below with reference to FIG. 18, FIG. 19, and FIG. 20. In the following explanation, for example, single-view images 250A to 250E taken from the central viewpoint of mutually different objects are input to the image processing apparatus 400. At that time, it is assumed that the single-view image 250A has the depth value of 1.0; the single-view images 250B, 250C, and 250D have the depth value of 0.5; and the single-view image 250E has the depth value of 0.2. The single-view images 250A to 250E are input in a sorted manner according to descending order of the depth values. Besides, it is assumed that the viewpoint count n=9.

The single-view images 250A to 250E are sequentially input to the image processing apparatus 400 and are buffered in the area 410 in the RAM 404. The GPU 402 reads the single-view image 250A of the first object from the area 410, inputs it to the VRAM 405, and writes it in the work buffer 412. Along with that, the GPU 402 obtains the depth value=1.0 of the single-view image 250A as the depth value depth1 (Step S10 illustrated in FIG. 17A).

Since the area 410 in the RAM 404 has the single-view image 250B of the next object stored therein, the GPU 402 obtains the depth value=0.5 of that single-view image 250B as the depth value depth2 (Step S11 and Step S12 illustrated in FIG. 17A). Since the depth value depth1 is different than the depth value depth2, the GPU 402 shifts the single-view image 250A, which is written in the work buffer 412, according to the depth value and the viewpoint and copies it in each of the tiles 414A to 414I in the tile-shaped multi-view image (Step S13 and Step S16 illustrated in FIG. 17A).

That is, with the depth value depth1 as an index, the GPU 402 obtains the shift vector of the viewpoint #0 (Step S21 and Step S22) and generates an image by shifting the single-view image 250A in, for example, the horizontal direction according to the obtained shift vector. Then, the GPU 402 writes the generated image in the tile 414A that corresponds to the viewpoint #0 in the area 413 in the VRAM 405 (Step S23). These operations are performed with respect to each of the remaining viewpoints from the viewpoint #1 to the viewpoint #8 (Step S24 and Step S25).

Once the single-view image 250A is copied in each of the tiles 414A to 414I, the GPU 402 reads the single-view image 250B corresponding to the depth value depth2 and writes it in the work buffer 412 (Step S17 illustrated in FIG. 17A). Meanwhile, the single-view image 250A that has been copied in each of the tiles 414A to 414I is, for example, destroyed from the work buffer 412. Then, the GPU 402 sets the depth value depth2=0.5 as the new depth value depth1 (Step S15).

Since the area 410 in the RAM 404 has the single-view image 250C of the next object stored therein, the GPU 402 obtains the depth value=0.5 of that single-view image 250C and sets it as the new depth value depth2 (Step S11 and Step S12 illustrated in FIG. 17A).

Since the depth value depth1 is same as the depth value depth2, the GPU 402 reads the single-view image 250C from the area 410 in the RAM 404. Then, the GPU 402 performs α-value-based alpha blending so as to synthesize the single-view image 250C with the single-view image 250B, which is written in the work buffer 412, and to generate a synthesized single-view image 253 (Step S14 in FIG. 17A). Subsequently, the GPU 402 sets the depth value depth2=0.5 as the new depth value depth1 (Step S15 illustrated in FIG. 17A).

Since the area 410 in the RAM 404 has the single-view image 250D of the next object stored therein, the GPU 402 obtains the depth value=0.5 of that single-view image 250D and sets it as the new depth value depth2 (Step S11 and Step S12 illustrated in FIG. 17A).

Since the depth value depth1 is same as the depth value depth2, the GPU 402 reads the single-view image 250D from the area 410 in the RAM 404. Then, the GPU 402 performs α-value-based alpha blending so as to synthesize the single-view image 250D with the synthesized single-view image 253, which is written in the work buffer 412, and to update the synthesized single-view image 253 (Step S14 in FIG. 17A). Thus, the synthesized single-view image 253 is formed by synthesizing the single-view images 250B, 250C, and 250D corresponding to the central viewpoint of the objects. Subsequently, the GPU 402 sets the depth value depth2 as the new depth value depth1 (Step S15).

Since the area 410 in the RAM 404 has the single-view image 250E of the next object stored therein, the GPU 402 obtains the depth value=0.2 of that single-view image 250E and sets it as the new depth value depth2 (Step S11 and Step S12 illustrated in FIG. 17A).

Since the depth value depth1 is different than the depth value depth2, the GPU 402 shifts the synthesized single-view image 253, which is written in the work buffer 412, according to the depth value and the viewpoint and copies it in each of the tiles 414A to 414I in the tile-shaped multi-view image (Step S13 and Step S16 illustrated in FIG. 17A).

Herein, in each of the tiles 414A to 414I, the single-view image 250A is written therein upon being shifted according to the depth value and the viewpoint. At the time of copying the synthesized single-view image 253 in each of the tiles 414A to 414I, the GPU 402 performs α-value-based alpha blending so as to synthesize the synthesized single-view image of each viewpoint with the already-written single-view image 250A of the corresponding viewpoint.

Subsequently, the GPU 402 reads, from the area 410 in the RAM 404, the single-view image 250E corresponding to the depth value depth2 and writes it in the work buffer 412 (Step S17 illustrated in FIG. 17A). Meanwhile, the synthesized single-view image that has been copied in each of the tiles 414A to 414I is, for example, destroyed from the work buffer 412. Then, the GPU 402 sets the depth value depth2=0.2 as the new depth value depth1 (Step S15).

Herein, the area 410 in the RAM 404 does not have a single-view image of the next object stored therein. Hence, as illustrated in FIG. 20, the GPU 402 shifts the single-view image 250E, which is written in the work buffer 412, according to the depth value and the viewpoint and copies it in each of the tiles 414A to 414I in the tile-shaped multi-view image (Step S18 illustrated in FIG. 17A).

In each of the tiles 414A to 414I, the single-view image 250A and the synthesized single-view image 253 are already shifted according to the depth values and the viewpoints, and are written in a synthesized form on a viewpoint-by-viewpoint basis. At the time of copying the single-view image 250E in each of the tiles 414A to 414I, as illustrated in FIG. 20, the GPU 402 performs α-value-based alpha blending so as to synthesize the single-view image 250E of each viewpoint with the already-written synthesized single-view image of the corresponding viewpoint. Once image synthesis is performed, the sequence of operations is completed.

As described above, in the image processing apparatus 400 according to the present embodiment, single-view images of the objects having the same depth values are synthesized into one synthesized single-view image. Then, that synthesized single-view image is shifted according to the depth values and the viewpoints, and is copied in each tile of a tile-shaped multi-view image. As a result, it becomes possible to substantially reduce the number of times for which single-view images are copied in each tile of the tile-shaped multi-view image. Hence, a multi-view image containing a number of objects can be drawn at a faster pace.

For example, in the case when the copying of a single-view image in each tile of a tile-shaped multi-view image is performed for each single-view image, then the copying count is equal to the number of single-view images×the viewpoint count. In the example illustrated in FIGS. 8 to 12, since the number of single-view images=5 and the viewpoint count n=9; the copying count becomes 5×9=45. In that case, the number of objects increases and the number of single-view images increases. As a result, the copying count goes on increasing. If the viewpoint count also increases, then the increase in the copying count is all the more noticeable.

Figure 18:
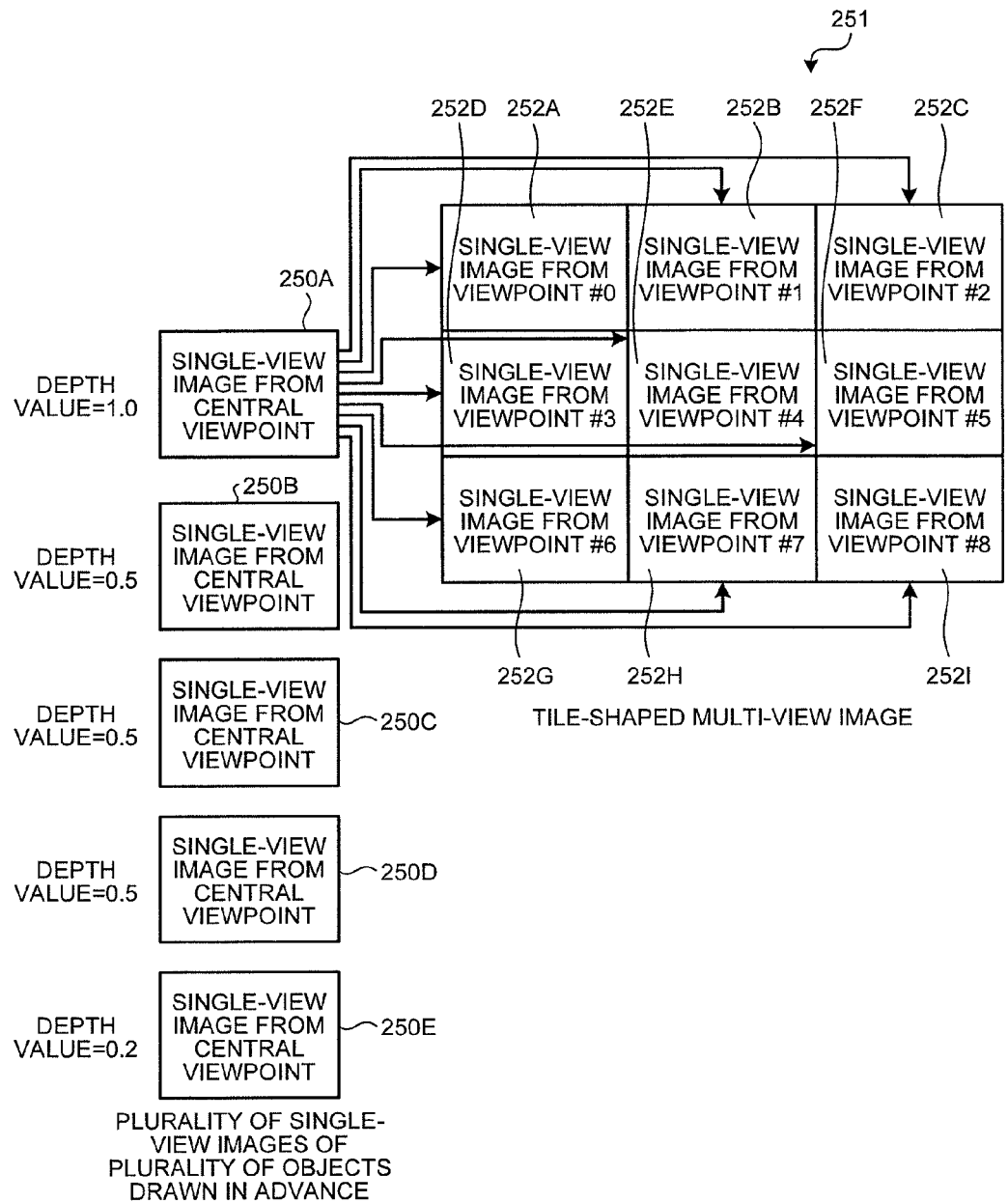
FIG. 18 illustrates synthesis of single-view images according to the embodiment.
Figure 19:
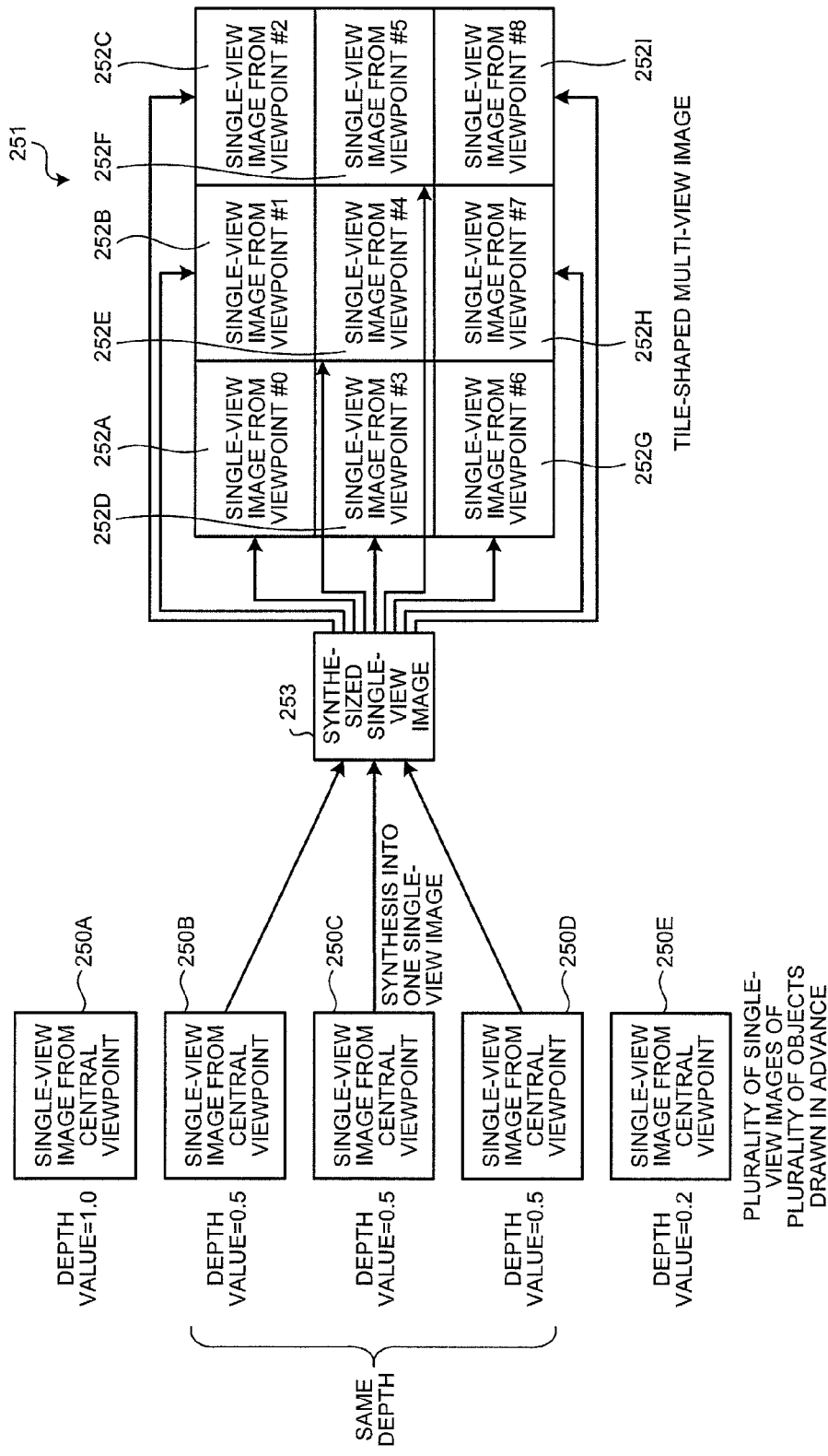
FIG. 19 illustrates synthesis of single-view images according to the embodiment.
Figure 20:
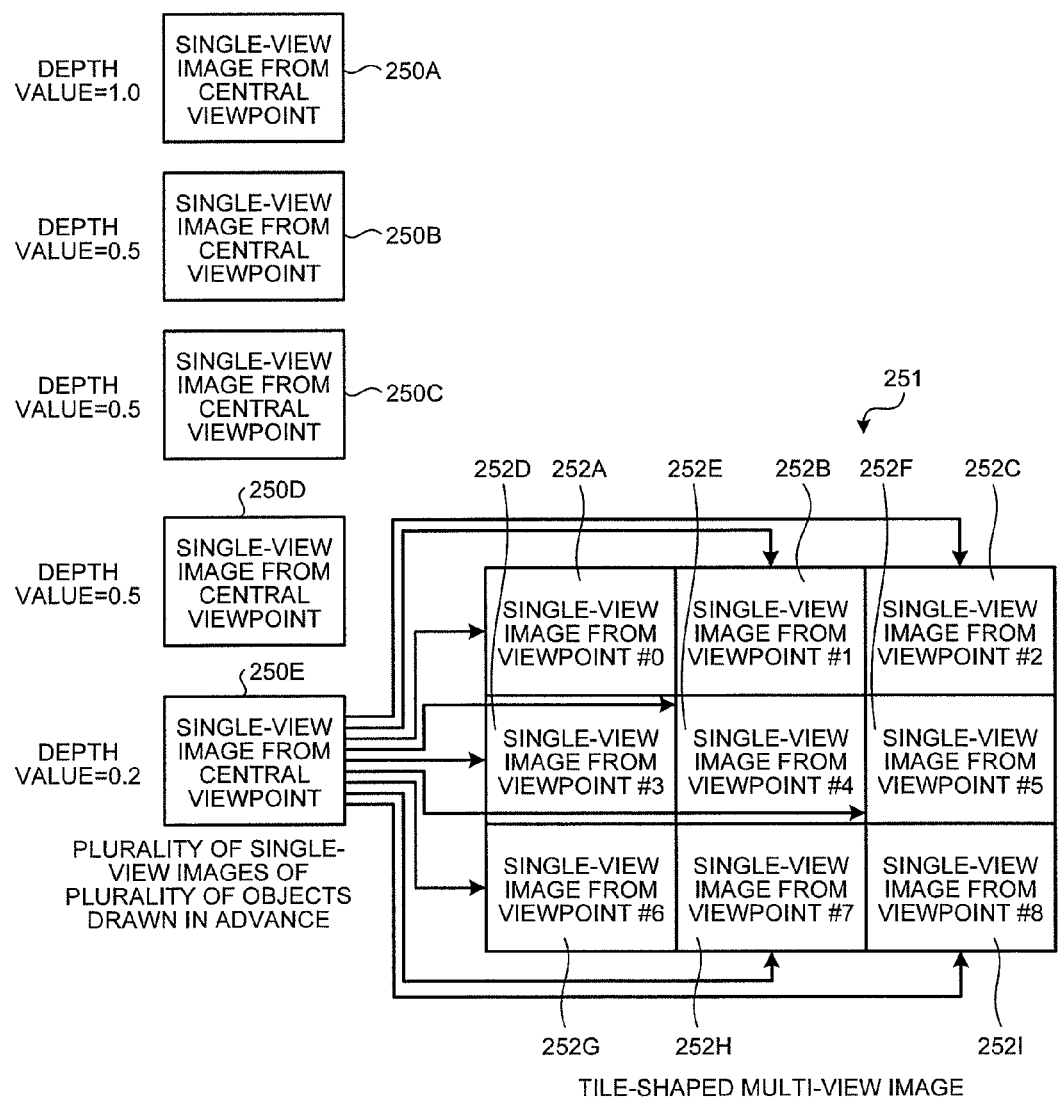
FIG. 20 illustrates synthesis of single-view images according to the embodiment.

In contrast, for example, in the example illustrated in FIG. 18 to FIG. 20 about the method according to the present embodiment; regarding the single-view images 250B to 250D having the same depth value, the total copying count is only 12 that includes the copying count of three at the time of synthesizing the single-view images 250B to 250D and the copying count of nine at the time of copying the synthesized single-view image in each tile in a tile-shaped multi-view image. The copying count of 12 is significantly smaller than the copying count of 27 (3×9 times) at the time of copying each single-view image in each tile. In the example illustrated in FIG. 18 to FIG. 20, the overall copying count is only 30 (12 times+×9 times), which is significantly smaller than the copying count of 45. Thus, the copying count is reduced by a large margin.

According to at least one embodiment described above, multi-view images can be drawn at a faster pace.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multi-view image generating method comprising:
synthesizing images having a same depth value into a single image from among a plurality of images, based on depth values each being associated with one of the plurality of images and indicating image position in the depth direction of the image;
shifting, with respect to each of a plurality of viewpoints each giving a different disparity, a synthesized image obtained at the synthesizing, according to a shift vector corresponding to the viewpoint and the depth value of the synthesized image in a direction and with an amount indicated in the shift vector, so as to generate an image having disparity given thereto; and
generating a multi-view image in which the images that are shifted and that are given disparity at the shifting are arranged in a predetermined format,
wherein a processor is used in performing the method.

2. The method according to claim 1, further comprising obtaining the shift vectors by referring to a shift information table in which the depth values and the shift vectors are stored in a corresponding manner, with the depth values stored in a depth information storing unit as an index, wherein the shifting includes shifting the synthesized image obtained at the synthesizing in a direction and with an amount indicated in the shift vector obtained at the obtaining.

3. The method according to claim 1, wherein the synthesizing, the shifting, and the generating are executed by an image processing unit configured to perform image processing using a memory under control of a control unit.

4. The method according to claim 3, wherein the synthesizing includes synthesizing, based on the depth values each stored in a depth information storing unit in a corresponding manner with each of the plurality of images stored in an image storing unit, images having the same depth value from among the plurality of images stored in the image storing unit, and the image storing unit and the depth information storing unit are configured in the memory.

5. The method according to claim 1, wherein the synthesizing includes synthesizing, in a buffer, a first image stored in the buffer and a second image having a same depth value as that of the first image; and storing, as a new first image, the synthesized image in the buffer, and the shifting includes retrieving the new first image from the buffer; and shifting, with respect to each of a plurality of viewpoints giving a different disparity, the new first image retrieved at the retrieving, according to a shift vector corresponding to the viewpoint and the depth value of the new first image in a direction and with an amount indicated in the shift vector, so as to generate an image having disparity given thereto.

6. A multi-view image generating apparatus comprising:

a control unit;

a memory;

an image processing unit that performs image processing using the memory under control of the control unit;

an image storing unit provided in the memory and configured to store therein a plurality of images;

a depth information storing unit provided in the memory and configured to store therein depth values, each indicating image position in the depth direction of one of the plurality of images stored in the image storing unit, in a corresponding manner with the plurality of images stored in an image storing unit;

a synthesizing unit configured to synthesize images having a same depth value into a single image from among the plurality of images stored in the image storing unit, based on the depth values stored in the depth information storing unit;

a shifting unit provided in the image processing unit and configured to perform shifting, with respect to each of a plurality of viewpoints each giving a different disparity, a synthesized image obtained by the synthesizing unit, according to a shift vector corresponding to the viewpoint and the depth value of the synthesized image in a direction and with an amount indicated in the shift vector, so as to generate an image having disparity given thereto; and a generating unit provided in the image processing unit and configured to generate a multi-view image in which the images that are shifted and that are given disparity by the shifting unit are arranged in a predetermined format.

* * * * *